US011100520B2

(12) United States Patent
Linden et al.

(10) Patent No.: US 11,100,520 B2
(45) Date of Patent: *Aug. 24, 2021

(54) PROVIDING INSIGHTS TO A MERCHANT

(71) Applicant: Facebook, Inc., Menlo Park, CA (US)

(72) Inventors: Lee Charles Linden, San Francisco, CA (US); Benjamin Lewis, San Francisco, CA (US); Dwight Ewing Crow, San Francisco, CA (US); Jonathan Shottan, San Francisco, CA (US); Peng Fan, Castro Valley, CA (US)

(73) Assignee: FACEBOOK, INC., Menlo Park, CA (US)

(*) Notice: Subject to any disclaimer, the term of this patent is extended or adjusted under 35 U.S.C. 154(b) by 76 days.

This patent is subject to a terminal disclaimer.

(21) Appl. No.: 16/363,783

(22) Filed: Mar. 25, 2019

(65) Prior Publication Data

US 2019/0220878 A1 Jul. 18, 2019

Related U.S. Application Data

(63) Continuation of application No. 14/564,530, filed on Dec. 9, 2014, now Pat. No. 10,242,374.

(51) Int. Cl.
*G06Q 30/02* (2012.01)
*G06Q 50/00* (2012.01)

(52) U.S. Cl.
CPC ......... *G06Q 30/0202* (2013.01); *G06Q 50/01* (2013.01)

(58) Field of Classification Search
None
See application file for complete search history.

(56) References Cited

U.S. PATENT DOCUMENTS

| 7,698,170 B1* | 4/2010 | Darr .................. G06Q 30/0609 705/26.35 |
| 8,332,271 B1 | 12/2012 | Wilder et al. |
| 10,242,374 B2 | 3/2019 | Linden et al. |
| 2002/0116266 A1 | 8/2002 | Marshall |
| 2003/0055707 A1 | 3/2003 | Busche et al. |
| 2003/0083925 A1 | 5/2003 | Weaver et al. |
| 2006/0095331 A1* | 5/2006 | O'Malley ........... G06F 16/9574 705/22 |
| 2009/0005987 A1 | 1/2009 | Vengroff et al. |
| 2010/0007601 A1 | 1/2010 | Lashina |
| 2010/0205045 A1* | 8/2010 | Zhang ................ G06Q 30/0207 705/14.1 |

(Continued)

OTHER PUBLICATIONS

U.S. Appl. No. 14/564,530, Jul. 19, 2017, Office Action.

(Continued)

*Primary Examiner* — Sujay Koneru
(74) *Attorney, Agent, or Firm* — Keller Jolley Preece

(57) ABSTRACT

Embodiments of the present disclosure relate generally to the generation and presentation of merchant insights to a brick-and-mortar merchant. More specifically, one or more embodiments of the present disclosure relate to detecting and identifying users visiting a merchant's retail location, determining product preferences of the identified users that relate to the merchant, and providing merchant insights to the merchant based on the determined product preferences.

20 Claims, 10 Drawing Sheets

(56) References Cited

U.S. PATENT DOCUMENTS

| | | | | |
|---|---|---|---|---|
| 2011/0231225 | A1 | 9/2011 | Winters | |
| 2011/0307319 | A1* | 12/2011 | Balestrieri | G06Q 30/0202 705/14.39 |
| 2012/0004950 | A1* | 1/2012 | Julian | G06Q 30/0203 705/7.32 |
| 2012/0109710 | A1* | 5/2012 | Rahman | G06Q 30/02 705/7.31 |
| 2012/0150598 | A1* | 6/2012 | Griggs | G06Q 30/0214 705/14.16 |
| 2012/0185330 | A1 | 7/2012 | Kleinrock et al. | |
| 2012/0215597 | A1* | 8/2012 | Ross | G06Q 30/0201 705/14.1 |
| 2012/0330722 | A1* | 12/2012 | Volpe | G06Q 30/0201 705/7.32 |
| 2012/0330769 | A1* | 12/2012 | Arceo | G06Q 20/4014 705/21 |
| 2013/0073388 | A1* | 3/2013 | Heath | G06Q 30/02 705/14.53 |
| 2013/0073473 | A1* | 3/2013 | Heath | G06Q 30/06 705/319 |
| 2013/0124263 | A1 | 5/2013 | Amaro et al. | |
| 2013/0144785 | A1* | 6/2013 | Karpenko | G06Q 20/425 705/44 |
| 2013/0246146 | A1* | 9/2013 | Fischer | G06Q 30/0201 705/14.23 |
| 2013/0268409 | A1 | 10/2013 | Chhajlani | |
| 2013/0290096 | A1* | 10/2013 | Lizotte, III | G06Q 30/0246 705/14.45 |
| 2014/0040001 | A1 | 2/2014 | Harvey et al. | |
| 2014/0136283 | A1 | 5/2014 | Carvalho et al. | |
| 2014/0257912 | A1 | 9/2014 | Hsieh et al. | |
| 2014/0278857 | A1 | 9/2014 | Bergman | |
| 2014/0304093 | A1* | 10/2014 | Cheng | G06Q 30/0207 705/16 |
| 2014/0310056 | A1 | 10/2014 | Alapati et al. | |
| 2014/0337090 | A1 | 11/2014 | Tavares | |
| 2014/0358612 | A1 | 12/2014 | Sri et al. | |
| 2015/0019281 | A1* | 1/2015 | Juneja | G06Q 10/087 705/7.25 |
| 2015/0100377 | A1* | 4/2015 | Penumaka | G06Q 50/01 705/7.29 |
| 2015/0112838 | A1* | 4/2015 | Li | H04W 4/21 705/26.61 |
| 2015/0127438 | A1* | 5/2015 | Wedderburn | G06Q 30/0214 705/14.16 |
| 2015/0170059 | A1 | 6/2015 | Gibson et al. | |
| 2015/0193784 | A1* | 7/2015 | Gao | G06Q 30/0619 705/7.29 |
| 2015/0269600 | A1 | 9/2015 | Randle | |
| 2015/0310497 | A1* | 10/2015 | Valin | G06Q 10/107 705/14.66 |
| 2015/0371303 | A1 | 12/2015 | Suri et al. | |
| 2016/0071140 | A1 | 3/2016 | Sherman | |
| 2016/0323247 | A1 | 11/2016 | Stein | |
| 2017/0270574 | A1* | 9/2017 | Hessurg | G06Q 30/0629 |

OTHER PUBLICATIONS

U.S. Appl. No. 14/564,530, Dec. 12, 2017, Office Action.
U.S. Appl. No. 14/564,530, Jul. 3, 2018, Office Action.
U.S. Appl. No. 14/564,530, Nov. 15, 2018, Notice of Allowance.

* cited by examiner

Merchant Insights For Evening Star's Book Boutique

Location: Downtown Store          Time Period: April 2014          Number of Identified Customers: 70

Recommended Products: Books by John Smith

Brand: Solitude Publishing

Notes: We've identified that 75% of identified users who visit your downtown location purchase books by John Smith online.

Recommended Location: The majority of users who purchase John Smith books frequently shop in the Historical Fiction Section.

Product(s) Detail:

Online Purchasing Location:
- Amazon 50%
- B&N 20%
- Solitude Publishing 15%
- Other 5%

Average Purchase Price: $15.95          Total Sales: $930.00

Average Shipping Price: $1.95          Price Range: $2.99 - $19.95

Purchasing Frequency: 1 Per 6 Months          Median Price: $14.99

Peak Purchasing Period: Jan - March

*Fig. 5*

PROVIDING INSIGHTS TO A MERCHANT

CROSS REFERENCE TO RELATED APPLICATIONS

This application is a continuation of U.S. patent application Ser. No. 14/564,530, filed Dec. 9, 2014. The aforementioned application is hereby incorporated by reference in its entirety.

BACKGROUND

1. Technical Field

One or more embodiments of the present disclosure relate generally to systems and methods for providing merchant insights. More specifically, one or more disclosed embodiments relate to systems and methods for providing merchant insights for one or more physical (i.e., brick and mortar) locations associated with a merchant.

2. Background and Relevant Art

A number of people visit retail establishments on a daily basis, sometimes multiple times a day. These establishments, such as retail stores, grocery stores, department stores, malls, strip malls, etc., provide people (e.g., customers) with the ability to purchase a variety of products (e.g., goods and services). Even with the growth of e-commerce and the ability to purchase products online, people still purchase a majority of products at physical retail establishments.

Merchants who operate retail establishments are regularly trying to better understand the customers who visit their retail establishments. For example, merchants often provide customer loyalty programs that allow the merchant to collect some personal information about their customers. Further, many customer loyalty programs also help the merchant match product purchases to individual customers. Merchants can use this information to tailor marketing and promotions for customers. However, conventional systems and methods used by brick-and-mortar merchants to obtain personal information and shopping behaviors of customers are significantly limited. In particular, in accordance with conventional methods, a merchant is only able to obtain information regarding purchases made directly from the merchant and of products the merchant already offers. As such, conventional systems and methods do not allow a brick-and-mortar merchant to know what additional product offerings its customers would be interested in.

More specifically, conventional systems and methods do not allow a brick-and-mortar merchant to obtain information regarding user interest and purchasing behaviors that occur beyond the merchant's retail locations. For example, under conventional systems and methods, a merchant is generally unable to identify products a customer purchases from other sources. Further, merchants are similarly unable to discover interests and preferences of a customer that are relevant to the merchant, but that are not evident from the customer's purchases from the merchant. For example, a merchant's customer may purchase a particular product online, but would purchase the product from the merchant's brick-and-mortar location if the merchant carried the product. However, the merchant has no way of discovering this fact and, therefore, will be unable to capitalize on this business opportunity.

Accordingly, these and other disadvantages exist with respect to conventional business models for brick-and-mortar retailers.

SUMMARY

Embodiments of the present disclosure provide benefits and/or solve one or more of the foregoing or other problems in the art with systems and methods for providing insights to a merchant regarding customers that visit the merchant's brick-and-mortar location(s). For example, the systems and methods disclosed herein provide a merchant with insights for expanding business opportunities with the merchant's current customers based on outside information associated with the customers.

In accordance with the embodiments disclosed herein, a merchant insights system may maintain social networking profiles with a plurality of users of a social networking system. The social networking profiles can include various product preferences based on expressed user interest and/or past product purchases. The merchant insights system can determine that one or more social networking system users have visited the merchant's brick-and-mortar location (e.g., using one or more presence detectors within the merchant's retail location). The merchant insights system may identify the users based on corresponding social networking user profiles associated with the users. Using the social networking user profiles for the visiting users, the merchant insights system may identify one or more product preferences for the users. The merchant insights system may provide merchant insights based on identified product preferences in a way that is customized for the user. For example, the merchant insights system may provide product offering recommendations to the merchant based on identified product preferences that are relevant to the merchant (e.g., related to and/or consistent with products offered by the merchant).

In addition, in accordance with some embodiments disclosed herein, the merchant insights system can provide merchant insights based on a number of users that frequent one or more retail establishments associated with the merchant. For example, the merchant insights system may provide merchant insights based on information gathered from users over the course of a month that visit a merchant. In some embodiments, the merchant insights system may provide a percentage breakdown of where customers are otherwise purchasing particular products (e.g., online merchants). In this manner, the merchant insights system may provide the merchant with valuable information regarding potential products, product brands, and product categories that could lead to increase product conversions (e.g., product sales) for the merchant.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, and dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore considered to be limiting of its scope, the disclosure will be described and explained with additional specificity and detail through the use of the accompanying drawings, in which:

FIG. 5 illustrates an example graphical user interface showing merchant insights in accordance with one or more embodiments;

DETAILED DESCRIPTION

Figure 1:
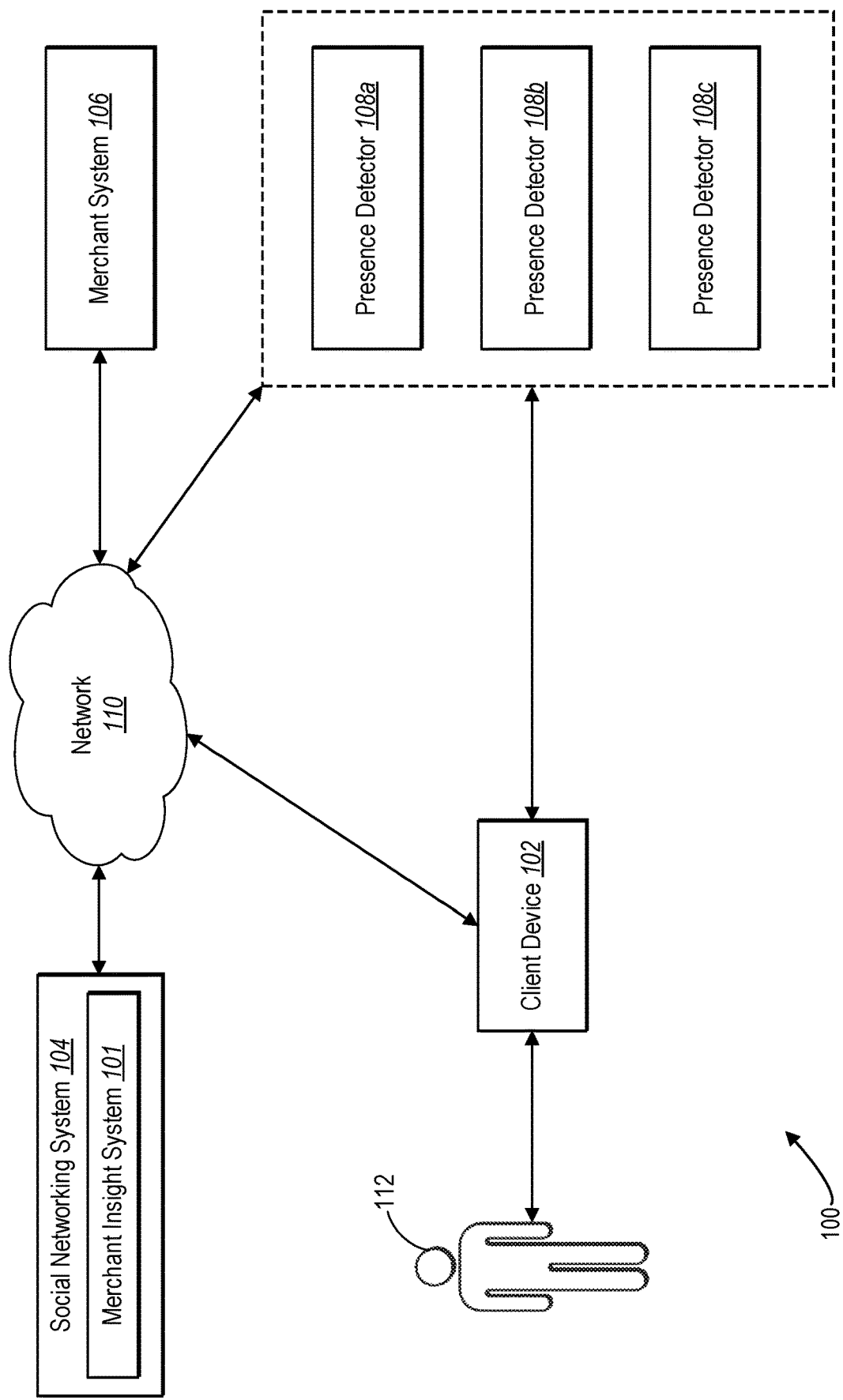
FIG. 1 illustrates a schematic diagram of a system for providing merchant insights to a merchant in accordance with one or more embodiments.

The embodiments disclosed herein provide systems and methods for providing merchant insights to a brick-and-mortar merchant. For example, the merchant insights system disclosed herein may provide merchant insights to a merchant using information previously unavailable to the merchant, such as information regarding purchases by the merchant's customers online and/or from third parties. To illustrate, the merchant insights system may detect which customers visit the merchant's retail location, identify product preferences from social networking profiles associated with the customers, and provide recommendations to the merchant regarding particular products, product brands, and/or product categories that the customers would be interested in if offered by the merchant. Accordingly, the merchant is able to make educated product offering decisions based on previously unavailable user interests and purchase histories of the merchant's current customers.

According to one or more disclosed embodiments, a social networking system can generate customized merchant insights based on the identification of social networking system users (or simply "users") who visit physical retail locations operated by or associated with a merchant. For example, one or more users of the social networking system may visit a retail location associated with the merchant. The social networking system may receive an indication when the users visit the retail location. The social networking system can update the user's social networking profile to reflect the user's visit to the merchant. Further, the social networking system can access the user's social networking profile to identify product preferences based on activities (e.g., purchasing behaviors) of the users that are not directly related to the merchant's retail location. For example, the user's social networking profile can include product preferences based on online browsing and shopping behaviors of a user, such as products that the user views, rates, purchases, etc.

The disclosed merchant insights system can also maintain a social networking profile for the merchant (or simply "merchant profile"). Using the merchant profile and the user profiles of the merchant's customers, the merchant insights system can identify product preferences of the customers that are particularly relevant to the merchant. For example, the merchant insights system can identify product preferences that relate to the merchant profile (e.g., related to and/or consistent with products the merchant already offers). Using the identified product preferences, the merchant insights system can generate and provide customized merchant insights for the merchant.

In some example embodiments, merchant insights may include a variety of information and recommendations that the merchant can use to increase product conversions. For example, the merchant insights system can recommend the merchant carry one or more additional products, product brands, or product categories preferred by the merchant's customers, as evidenced by the customers' product preferences evident from the customers' activities unrelated to the merchant. For instance, and as a non-limiting example, the merchant insights system may recommend that a grocer add an organic isle to its customers based on the customers' preference for organic products. In another instance, the merchant insights system may recommend that a merchant change brands for a particular product from a first brand to a second brand based on the customers' preference for the second brand.

In addition, the merchant insights system can provide product information for a recommended product to a merchant via merchant insights. For example, the product information can include product purchase amounts (e.g., the volume of the recommended product purchased by the merchant's customers), online merchants where customers otherwise buy the recommended product, and prices paid by the customers for the recommended product. As another example, the merchant insights system can provide recommendations based on a user's location within a merchant's retail location. To illustrate, the merchant insights may include a recommendation to a merchant to add a brand of women's jeans to the women's clothing area based on user product preferences and where users shop in the merchant's store. In particular, the recommendation may be based on user profiles showing a large number of online purchases of the particular brand of women's jeans. Further, the same user profiles may show that corresponding users spend an above average amount of time in a particular area of the merchant's retail location. Accordingly, the merchant insights can not only include a recommendation regarding a new product the merchant should carry, but also a recommendation on where to place the new product within the merchant's retail location to increase product conversions.

As used herein, the term "product" may refer to any good (tangible or intangible), service, article, or other marketable object or offering. Further, "product" and "products" can refer to a single product or to a grouping of products. The term "product category" may refer to any grouping, type, class, division, subdivision, set, kind, genre, or classification of products. The terms "product brand" or "brand" may refer to a name, term, design, symbol, or any other feature that identifies one merchant's product distinct from those of other merchants.

The term "product preference" may interchangeably refer to any interest, preference, or proclivity with respect to a product, product brand, and/or product category. Generally speaking, a product preference may reflect an expectation of action by a user with respect to a particular product (e.g., an expectation that the user will purchase the product). For example, product preferences may be based on information regarding past purchases, interests, recommendations, ratings, reviews, comments, survey results, statistics, social networking activity related to products (e.g., check-ins, likes, etc.), or any other information/data related to and/or indicating interest in a product, product brand, or product category. Product preferences can be derived from any suitable source of information. For example, product preferences may be based on information directly obtained by a social networking system (e.g., regarding purchases made through or interactions with the social networking system), information obtained from one or more third-parties (e.g., third-party e-commerce websites), and/or information obtained from a user's own device(s) (e.g., directly provided by a user, or obtained from cookies, tracking pixels, and/or any other tracking/logging software that records a user's product browsing and/or purchasing history).

Further, product preferences may be subject to user preferences, such as privacy settings set by a social networking system user. For example, a social networking system user may specify which information the social networking system is allowed to track, the length of time the social networking system is allowed to save user-specific information, and/or how the social networking system is allowed to use user-specific information. Alternatively, a social networking system user may opt-out from the social networking system storing or applying obtained user information. In some example embodiments, a user of a social networking system may clear or reset stored user information obtained by the social networking system.

As used herein, the term "merchant" may refer to any provider of goods and/or services. In some example embodiments, a merchant may be affiliated with a social networking system (e.g., the merchant may sell one or more products by way of the social networking system). Alternatively, the merchant may be a third-party merchant that is separate from and independent of a social networking system. Examples of merchants include, but are not limited to, merchants providing a specific category of product (e.g., DELL), merchants providing a broad variety of products (e.g., AMAZON), merchants having physical as well as virtual stores (e.g., SEARS), merchants having only virtual stores (e.g., EBAY), and merchants having only physical stores. The term "retail location," as used herein, refers to a physical, "brick-and-mortar" location where a merchant offers goods and/or services for sale.

Example embodiments will now be described in relation to the figures. FIG. 1 illustrates a schematic diagram of an example system 100 for providing merchant insights. An overview of the system 100 along with a detailed description of the components and processes of the system 100 will be described in relation to FIG. 1. Thereafter, additional example embodiments will be described in relation to the remaining figures.

FIG. 1 illustrates an example embodiment of a communication system 100 (or simply "system 100"). As shown, the system 100 may include a client device 102, a social networking system 104 including a merchant insights system 101, a merchant system 106, and multiple presence detectors 108a-c (collectively referred to as "presence detectors 108"), which may communicate by way of a network 110. Although FIG. 1 illustrates a particular arrangement of the client device 102, the social networking system 104, the merchant system 106, the presence detectors 108, and the network 110, various additional arrangements are possible. For example, the client device 102 may directly communicate with the social networking system 104 and/or merchant system 106, bypassing the network 110.

As mentioned, the client device 102, the social networking system 104, the merchant system 106, and the presence detectors 108 may communicate via the network 110, which may include one or more networks and may use one or more communications platforms or technologies suitable for transmitting data and/or communication signals. Additional details relating to the network 110 are explained below with reference to FIG. 8.

As illustrated in FIG. 1, a user 112 may interface with the client device 102, for example, to access the social networking system 104 and/or the merchant system 106. The user 112 may be an individual (i.e., human user), a business, a group, or other entity. Although FIG. 1 illustrates only one user 112, it is understood that system 100 can include a plurality of users, with each of the plurality of users interacting with the system 100 with a corresponding client device.

The client device 102 may represent various types of client devices. For example, the client device 102 may be a mobile device (e.g., a mobile telephone, a smartphone, a PDA, a tablet, a laptop, a camera, a tracker, a watch, a wearable device, etc.). However, the client device 102, in some embodiments, may be a non-mobile device (e.g., a desktop or server; or another type of client device). Additional details with respect to the client device 102 are discussed below with respect to FIG. 8.

The client device 102 may employ active and/or passive communication with one or more presence detectors. For example, the client device 102 may employ Bluetooth (e.g., Bluetooth low energy or BLE), Wi-Fi, near field communication or NFC, radio-frequency identification or RFID, or other technologies to communicate with presence detectors 108. For example, the client device 102 may transmit an identification number identifying the client device 102 to a presence detector 108 and/or receive an identifier back from the presence detector 108. In some examples, the presence detector 108 may continuously broadcast a signal including an identifier associated with the presence detector 108 for detection by the client device 102 or other devices. Additionally or alternatively, the client device 102 may be equipped with GPS functionality that reports the user's GPS-based location to the social networking system 104.

The merchant system 106, as illustrated in FIG. 1, may be associated with a merchant. For example, the merchant may manage and operate the merchant system 106. The merchant system 106 may comprise one or more computing devices. Further, the merchant system 106 may be associated with one or more of the merchant's physical retail locations. For instance, the merchant system 106 may assist the merchant in tracking inventory, sales, product orders, etc., in connection with a retail location. In addition, the merchant system 106 may be in communication with the social networking system 104. For example, the social networking system 104 may maintain a profile associated with the merchant. The information within the profile may include information provided, directly or indirectly, by the merchant. The merchant profile on the social networking system 104 may include information regarding products, product brands, and product categories provided by the merchant (e.g., within the merchant's physical retail location).

As illustrated in FIG. 1, the system 100 may include one or more presence detectors 108. The presence detectors 108 may be configured to individually and/or collectively detect the presence of client device 102 and/or any other client devices. For example, the presence detectors 108 can be located within a physical retail location and can detect the presence of the client device 102 (or other client devices) within the physical retail location and/or within specific areas within the physical retail location, as will be explained in more detail below.

The presence detectors 108, in some example embodiments, may communicate with each other. For example, presence detector 108a, presence detector 108b, and presence detector 108c may be co-located within a merchant's retail establishment and may communicate with each regarding detected client devices. Alternatively, the presence detectors 108 may be independent of each other. For example, presence detector 108a, presence detector 108b, and presence detector 108c may each be associated with a separate merchant and located at different retail locations associated with the separate merchants.

A presence detector, such as presence detectors 108, can detect when a client device enters and exits an area associated with the presence detector. For example, a presence detector can detect when a client device comes within range (e.g., communication range) of the presence detector and subsequently when the client device leaves the detection range of the presence detector. Further, in some embodiments, a presence detector can determine a position of a client device relative to the presence detector, a distance of the client device from the presence detector, a distance range of the client device relative to the presence detector, and/or a direction of movement of the client device. For example, a presence detector may detect that a client device is northwest of the presence detector by 7 feet. As another example, a presence detector may detect when a client device is within a specified proximity range, such as 0-1 meters, 1-5 meters, 5-10 meters, 10-50 meters, etc., or within a certain specified area (e.g., the dairy section or shoes department of a merchant's retail location). For instance, each department in a department store may have one or more presence detectors that detect when a client device enters and exits a particular department. As a further example, a presence detector may determine when a client device has crossed a specified point or line, such as the entrance of a retail establishment.

When a presence detector 108 detects a client device 102, the client device 102 can send a detection notification, directly or via the network 110, to the social networking system 104 and/or the merchant system 106. For example, in some embodiments, one or more presence detectors 108 may communicate directly with the merchant system 106. For instance, presence detector 108a and presence detector 108b may be located within a merchant's retail establishment and directly communicate to the merchant system 106 (e.g., via a local Wi-Fi network). Upon receiving a detection notification that client device 102 has entered, remained in, and/or exited the detection range of a presence detector 108, the merchant system 106 may pass the information to the social networking system 104. For example, the merchant system 106 may pass identification numbers corresponding to the detected client devices (e.g., unique user or device IDs) to the social networking system 104. Alternatively, a presence detector can send detection notifications to the social networking system 104 by way of the network 110 or a third-party service.

In an alternative embodiment, the client device 102 may detect the presence of one or more presence detectors 108 and send corresponding detection notifications, including identifiers, to the social networking system 104. For example, the user 112 of client device 102 may enter into a merchant's physical retail establishment. As the user 112 moves within the merchant's establishment, the user's client device 102 may move into the range of one or more presence detectors 108 and receive/detect signals broadcasted by the one or more presence detectors 108. The signals from the presence detectors 108 may include one or more identifiers identifying each presence detector 108 to any device, such as the client device 102, receiving the signal. The client device 102 may send a notification to the social networking system 104 upon identifying a presence detector 108 based on a broadcast signal. The notification may include the identifier of the client device 102 as well as the one or more identifiers associated with the detected presence detectors 108. Further, the client device 102 may send additional information to the social networking system 104, such as a GPS coordinate of the client device 102 at the time the client device 102 detected the broadcast signal from the presence detector 108.

In some example embodiments, the client device 102 may include an application that enables the client device 102 to detect one or more presence detectors. The application may be associated with the social networking system 104 or may be a third-party application that sends indications to the social networking system 104 when the client device 102 detects a presence detector. To illustrate, the user 112 may have a social networking application on their client device 102 that interfaces with the social networking system 104. The social networking application may enable to user's client device 102 to detect a presence detector 108 in a merchant's retail location. Further, upon detecting a presence detector in a merchant's retail location, the social networking application may report the detected presence detector 108 to the social networking system 104 along with any information necessary to identify the user 112, the client device 102, the presence detector(s) 108, and/or a corresponding merchant.

As illustrated in FIG. 1, the social networking system 104 can include a merchant insights system 101. The merchant insights system 101 can provide merchant insights to a merchant, for example, by way of the merchant system 106. More specially, the merchant insights system 101 can generate merchant insights based on product preferences of one or more users (e.g., user 112) who visit the merchant's retail locations. To illustrate, the merchant insights system 101 may receive an indication when the user 112 visits the merchant's retail location, for example, from client device 102 and/or presence detector 108a. The merchant insights system 101 can identify a social networking profile associated with the user 112. Then, based on the social networking profile for the user 112, the merchant insights system 101 can identify one or more product preferences that relate to the merchant. Using the identified product preferences for the user 112 (along with product preferences for other users that have visited the merchant's retail location(s)), the merchant insights system 101 can generate and provide merchant insights to the merchant.

Figure 2:
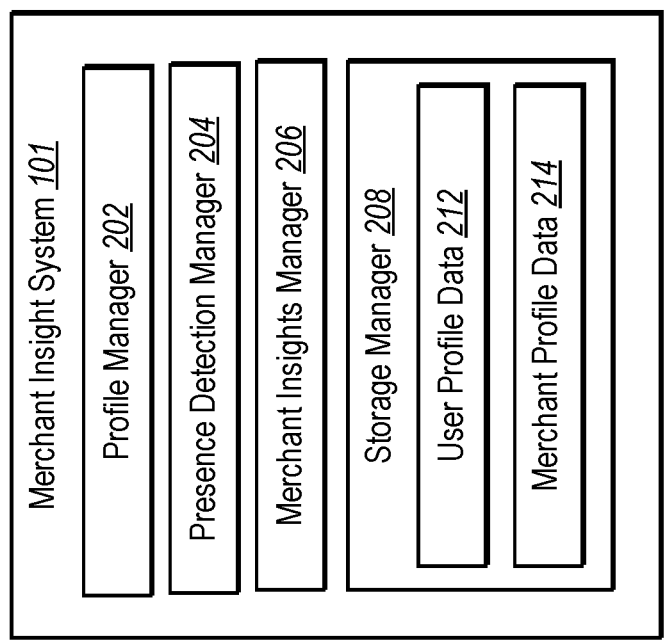
FIG. 2 illustrates an example schematic diagram of a merchant insights system in accordance with one or more embodiments.

Additional detail regarding the merchant insights system 101 will now be discussed in connection with FIG. 2. FIG. 2 illustrates an example of the merchant insights system 101 in accordance with one or more embodiments. The merchant insights system 101 of FIG. 2 may be an exemplary embodiment of the merchant insights system 101 discussed in connection with FIG. 1. For example, the merchant insights system 101 may be part of a social networking system (such as social networking system 104), and may communicate with a client device (such as client device 102), one or more presence detectors (such as presence detectors 108), and/or a merchant system (such as merchant system 106) via a network (such as network 110).

As shown in FIG. 2, the merchant insights system 101 can include various components for performing the processes and features described herein. For example, in the illustrated embodiment, the merchant insights system 101 includes a profile manager 202, a presence detection manager 204, a merchant insights manager 206, and a storage manager 208. The various components of the merchant insights system 101 may be in communication with each other using any suitable communications protocols, such as described with respect to FIG. 8 below.

Each component of the merchant insights system 101 may be implemented using one or more computing devices (e.g., server devices) including at least one processor executing instructions that cause the merchant insights system 101 to perform the processes described herein. The components of the merchant insights system 101 can be implemented by a single server device or across multiple server devices, as described above. Although a particular number of components are shown in FIG. 2, the merchant insights system 101 can include more components or can combine the components into fewer components (such as a single component), as may be desirable for a particular implementation.

The profile manager 202 can manage one or more profiles including social networking profiles for users and merchant profiles for merchants. For example, as described above, each user in a social networking system can be associated with a social networking user profile (or simply "user profile"). In managing user profiles, the profile manager 202 can update (e.g., supplement, add, remove, modify, augment, etc.) information within the user profiles.

In one or more embodiments, a user profile may include, but is not limited to, user information, social networking activity information, merchant activity information, and third-party content activity information. User information can include personal information about a user (e.g., name, gender, age, birth date, hometown, etc.), contact information (e.g., residence address, mailing address, current city, email addresses, phone numbers, screen names, user ID, etc.), educational information (e.g., school, highest schooling level obtained, time period, class year, concentration, degree, etc.), employment information (e.g., employer, position, employer locations, employment history, etc.), family and relationship information (e.g., married to, engaged to, partners with, parents of, siblings of, children of, cousin of, relationship with, etc.), and other personal information.

Social networking activity information can include information associated with a user's activity within the social networking system. For example, social networking activity information can include interests (e.g., likes, page visited, games played, posts created, posts read, comments, clicks, groups, interest lists, etc.), social connections (e.g., "friends," groups, following, members of, connections, etc.), tags (e.g., tags in photos, videos, posts, etc.), interactions (e.g., clicks, views, conversions, etc.) by the user with advertisements provided by way of the social networking system, product purchases made by the user from or using the social networking system, applications used by the user on the social networking system, devices used by the user to connect with the social networking system, and other social networking activity information as described herein. As the user interacts within the social networking system, the profile manager 202 (or another similar component within the merchant insights system 101) can update the social networking activity information associated with the user.

Similarly, the profile manager 202 can manage merchant activity information in a user profile. Merchant activity information can include, for example, information associated with a user's interactions with a merchant at one or more of the merchant's retail locations, or with the merchant's website and/or mobile e-commerce applications. For example, merchant activity information can include presence information for a user as the user shops at the merchant's physical retail location. For instance, merchant activity information may include information such as the time/date a user entered the merchant's retail location, the duration of the user's stay at the retail location, which area(s) of the retail location the user visited and for how long, the frequency of user visits to the retail location, whether the user was with other users when visiting the retail location, whether a user often passes by or through the retail location, etc.

The profile manager 202 can include third-party content activity information in a user profile. Third-party content activity information can include information that corresponds to the user's activity with respect to content outside of the merchant's retail location and/or outside of a social networking system. For example, third-party content activity information can correspond to a user's interactions online with third-party merchants (e.g., third-party e-commerce websites). For instance, third-party content activity information can include information indicating a user's product preferences (e.g., preferences with respect to products, product brands, product categories, product colors, product prices, product sizes, etc.), based on, for example, online browsing and purchase histories of the user. In particular, third-party content activity information can include information regarding product pages the user views, products the user adds to a shopping cart (e.g., a virtual shopping cart), and/or products the user purchases from the third-party merchants.

In one or more embodiments, the profile manager 202 may receive third-party content activity information from a client device associated with a user. For example, the profile manager 202 can obtain third-party activity information by way of one or more tracking elements (e.g., cookies, tracking pixels, etc.) that cause a user's client device to send data associated with the user's third-party content interactions to the profile manager 202. The received information can include information identifying the user (e.g., a user ID), as well as information identifying the content with which the user has interacted (e.g., a unique content identifier, a product identifier, a web address, a third-party merchant identifier, etc.). The profile manager 202 can also receive (e.g., from the client device or from a third party), a webpage type (e.g., a landing webpage, a product webpage, a webpage in the checkout process, etc.), a type of user interaction (e.g., general product browsing, specific product viewing, product comparisons, product purchasing, etc.), product information (e.g., product names, product descriptions, product brands and/or categories, etc.), interaction duration, interaction frequency, and/or any other suitable information associated with the user's third-party content interactions. In addition, the profile manager 202 can update the user profile to include the date and time the user interacted with the third-party content, the client device that the user was using to interact with the third-party content, and details about the user interaction (e.g., browsing activity, shopping cart activity, purchasing activity and history, ratings, reviews, recommendations, shares, etc.). Additional detail regarding tracking social networking user activity in connection with a third-party is provided in U.S. patent application Ser. No. 14/460,219, titled EXPANDED TRACKING AND ADVERTISING TARGETING OF SOCIAL NETWORKING USERS, the contents of which are incorporated herein by reference in their entirety.

In one or more embodiments, the profile manager 202 can also infer interests levels in products, product brands, and/or product categories based on the information received from third parties. To illustrate, a tracking element may be located on various third-party ecommerce websites, applications, and/or the client device. The tracking element may cause a client device to provide information back to the profile manager 202 regarding purchasing behaviors and/or viewing activities of users. As such, the profile manager 202 may receive and store activity information that includes products users are shopping for and have purchased based on their third-party activity (e.g., activity outside of the merchant system with third-party merchants). Using the stored information, the profile manager 202 can infer an interest level for a products, product brands, and/or product categories for a user. For example, the profile manager 202 may infer a high level of interest for a product that a user adds to a shopping cart and a low interest level to a product that the user temporarily hovers over to view additional information on an advertisement webpage that displays a number of products.

In some example embodiments, the profile manager 202 can obtain and manage third-party content activity information from multiple third-party merchants. In particular, the profile manager 202 may aggregate third-party content activity information for a plurality of third-party merchants, and then utilize the aggregated information to identify product preferences for the user. For example, if a user views or interacts with (e.g., shops for) a specific product on a number of merchant websites, the profile manager 202 may aggregate the information across all of the merchant websites to identify, for example, an aggregate amount of time for the user's interactions associated with the product, an aggregate number of interactions associated with the product, an aggregate number of purchases of the product, a range or average of prices paid by the user for the product, an aggregate amount of money spent by the user on the product, a percentage breakdown of where the user purchases the product, a number of web sites/merchants from which the user has purchased the product, and/or aggregate information for any other aspect of the user's interactions associated with the product.

Over time, as the profile manager 202 obtains information associated with a user and the user's shopping habits and other activities, the user profiles grow to include a wealth of user activity information that is helpful in identifying the user's product interests/preferences. The merchant insight system 101 can use this information, as described below, to provide valuable merchant insights to brick-and-mortar retailers regarding their current customers and based on information not available by conventional means.

Using the foregoing and other types of information in a user's social networking user profile, the profile manager 202 can determine one or more product preferences of a user. For example, using the obtained information associated with a user, the profile manger 202 can identify one or more products the user likes and/or purchases, one or more preferences for a particular product (e.g., quantity preference, color preference, size preference, price preference, etc.), one or more brand preferences for a particular type of product (e.g., if the user prefers a particular brand for a particular type of product), one or more types of products of interest to the user, one or more product categories of interest to the user, and/or any other information associated with and/or indicating a user's product preferences. The profile manager 202 can also update a user's profile to include obtained information and determined product preferences.

In identifying and/or managing product preferences, the profile manager 202 can utilize information available by way of a social graph maintained for a social networking system. For example, the profile manager 202 can utilize obtained information to look up product data from a product node within a social graph. The product node can include information such as a product name, product type, product brand, product category, model numbers, color options, size options, and/or any other suitable information associated with a product. The profile manager 202 can utilize this product information to assist in the process of identifying product preferences for a user and/or updating a user profile associated with the user.

The profile manager 202 can also manage one or more merchant profiles corresponding to one or more merchants, as mentioned above. A merchant profile may relate to a merchant's social networking profile. Further, a merchant profile may include products, product brands, and product categories associated with the merchant. For example, the merchant profile may indicate a merchant type (e.g., a retail type, such as department store, specialty store, grocery store, box store, wholesale store, etc.). The merchant profile can also include a number of product categories (e.g., automotive, baby products, beauty, books, clothing, electronics, gift cards, grocery and gourmet foods, health and personal care, home and garden, home improvement and tools, jewelry, kitchen, luggage and bags, music, musical instruments, office supplies, pet supplies, shoes, sports and outdoors, toys and games, watches, collectibles/miscellaneous, etc.) associated with the merchant. Product categories may include sub-categories in one or more embodiments. For example, the product category of shoes may include the product sub-category of running shoes, dress shoes, and tennis shoes. Each product category (or sub-category) within the merchant profile may include a plurality of products. For example, a merchant may offer a variety of running shoes within the product sub-category of running shoes. The products within a product category (or sub-category) may also be associated with one or more products brands. For example, the merchant may carry running shoes under name brand labels as well as generic labels. The merchant profile may also include, or be linked to, product information associated with each product. For example, the merchant profile may link to a product node for a product, as described below in connection with FIGS. 9 and 10.

In additional or alternative embodiments, a merchant profile may include information associated with a merchant's retail location. For example, the merchant profile can include a merchant's inventory, a layout of the merchant's store including an identification of where products are placed within the store, and/or purchase information for purchases made at the store (e.g., for the current customers of the merchant). In some embodiments, the profile manager 202 can receive information for a merchant profile from the merchant system 106. For example, the merchant system 106 may be used to set up the merchant profile and/or to provide information for inclusion in the merchant profile.

In addition, the merchant profile may include products of particular interest to the merchant, such as products the merchant is featuring or promoting over other products. In this manner, the merchant can provide a focus on which products the merchant insights system 101 should focus on, if possible, when providing merchant insights to the merchant.

As illustrated in FIG. 2, the merchant insights system 101 may include a presence detection manager 204. In general, the presence detection manager 204 identifies when one or more users (e.g., users of a social networking system) are detected at a retail location associated with a merchant. In particular, the presence detection manager 204 may detect the presence of a user at the merchant's retail location based on one or more communications between the user's client device and one or more presence detectors within the merchant's retail location, as described herein.

In one or more embodiments, the presence detection manager 204 may receive an indication (e.g., from a client device, from a presence detector, or from a merchant system) that a user is visiting, or has visited, a merchant's retail location. For example, a presence detector may detect that a user has entered the merchant's retail location, as described above, and an indication that the user has visited the merchant's retail location may be sent to the merchant insight system 101. The indication may identify a corresponding client device (e.g., using a device ID), user (e.g., using a user ID), retail location (e.g., using a merchant ID or location ID), and/or presence detector (e.g., using a presence detector ID). Based on the received indication, the presence detection manager 204 can identify the user corresponding to the client device. For example, the presence detection manager 204 can identify a user by matching a received user identifier and/or client device identifier with information contained in a user profile.

In some example embodiments, the presence detection manager 204 can identify a particular area or areas where a user was located within a retail location associated with a merchant. For example, the merchant may have a number of presence detectors at a retail location. In particular, the merchant may have a presence detector in each area (e.g., department) of a store. As a user moves from area to area within the store, different presence detectors can detect the user and notify the presence detection manager 204. To illustrate, and referring again to FIG. 1, user 112 may be browsing through a grocery store. The grocery store may have presence detectors 108 in the produce area, meat and seafood area, deli and bakery area, pharmacy area, and natural and organic products area. As the user 112 moves from one area to the next, the corresponding presence detectors can detect the user's client device 102 and send or cause the client device 102 to send an indication to the presence detection manager 204 regarding the user's specific location area within the retail location. As described above, the indication can include timestamps of when the users entered and exited each location.

In additional embodiments, the presence detection manager 204 can associate the location of the user with one or more products, product brands, and/or product categories available near the location. For example, based on a merchant profile and based on the user's location within the store, the presence detection manager 204 may be able to identify one or more products that the user was likely shopping for. If a presence detector indicates a user's location within two to five feet, the presence detection manager 204 may identify which products the user may be browsing. For instance, a presence detector may indicate to the presence detection manager 204 that a user is facing the presence detector at a distance of three feet. From the indication, the presence detection manager 204 may identify that the user is facing a product or category of products.

Further, the presence detection manager 204 can identify how long a user lingers in a specific area, and which areas the user visits most often. For example, a presence detector can send (or cause to be sent) an indication that a user has entered the golf area in a sports store. The presence detector can periodically send (or cause to be sent) additional or updated indications informing the presence detection manager 204 that the user is still within the golf area. Additionally or alternatively, the presence detector can send an indication to the presence detection manager 204 when the user is no longer in the golf area. Further, each time the user visits the golf area, the presence detector can send an indication to the presence detection manager 204. In this manner, the presence detection manager 204 can identify which retail locations and/or areas a user frequents, how often a user returns to each area, and how long a user stays in each area visited.

As illustrated in FIG. 2 and as mentioned above, the merchant insights system 101 may include a merchant insights manager 206. In general, the merchant insights manager 206 can provide merchant insights to a merchant to help the merchant improve product conversions (e.g., product sales). More particularly, and as described below, the merchant insights manager 206 can identify product preferences for users whose presence is detected at a merchant's retail location. Further, the merchant insights manager 206 can identify product preferences for the users that are relevant to the merchant, such as product preferences that correspond to the merchant's profile. Additionally, the merchant insights manager 206 can generate merchant insights to provide to the merchant based on the relevant product preferences. Additional detail regarding the merchant insights manager 206 will now be described.

In one or more embodiments, the merchant insights manager 206 can identify, using information from the presence detection manager 204, users who have visited a specific retail location associated with a merchant. For example, the merchant insights manager 206 can determine which users have visited a retail location associated with a merchant based on information received from presence detectors 108, client device 102, and/or merchant system 106.

In one or more embodiments, the merchant insights manager 206 may apply one or more criteria when identifying users that have visited the merchant. For example, the merchant insights manager 206 may identify users who visited the merchant's retail location within a predefined time period (e.g., the past month, the past six months, or the past year) and/or visited the merchant's retail location more than a threshold number of times. As another example, the merchant insights manager 206 may identify users who meet one or more other factors, such as being over a certain age, not being in a relationship, and/or spending a minimum dollar amount shopping per year.

In some example embodiments, the merchant insights manager 206 may filter out identified users to increase the accuracy/relevance of merchant insights and the likelihood that the merchant insights will lead to increased product conversions. To illustrate, the merchant may be a high-end perfume boutique. In identifying users, the merchant insights manager 206 may only identify users who have visited the merchant's retail location who are over 20 and have a current income stream. As such, the merchant insights manager 206 may filter out, for example, teenage users who frequent the boutique, but who often do not purchase any products. One will appreciate that the merchant insights manager 206 can apply a number of factors, filters, and/or criteria to identify groups of users who have visited a merchant's retail location and are likely sources for additional product conversions.

After the merchant insights manager 206 identifies users who have visited the merchant's retail location, the merchant insights manager 206 can analyze product preferences for the identified users. In particular, the merchant insights manager 206 can identify common preferences for products, product brands, and/or product categories across the identified users. For example, the merchant insights manager 206 can identify common products that the identified users have purchased online and product brands the identified users have browsed, purchased, and/or "liked" online. As another example, the merchant insights manager 206 may determine preferred product categories based on analyzing product preferences for the identified users.

In some example embodiments, the merchant insights manager 206 can create one or more recommendations for carrying one or more products, product brands, and/or product categories based on the product preferences of the identified users. For example, the merchant insights manager 206 can determine that a number of identified users have an affinity to a particular product and/or brand. For example, if the merchant is a clothing store, the merchant insights manager 206 may determine that the identified users frequently purchase of a particular brand of clothing that the merchant does not already carry. Accordingly, the merchant insights manager 206 may recommend that the merchant begin carrying the particular brand of clothing. As another example, the merchant insights manager 206 may determine that 60% of the identified users have made online purchases of a particular product that the merchant does not already carry, but that would not be inconsistent with the merchant's current product line. Accordingly, the merchant insights manager 206 may recommend that the merchant begin carrying the particular product.

In merchant insights, the merchant insights manager 206 may identify product preferences of the users that visit the merchant's retail location and then determine a relevancy of each product preference to the merchant. In particular, the merchant insights manager 206 can determine which of the identified product preferences are relevant to the merchant based on, for example, a merchant profile associated with the merchant.

The merchant insights manager 206 can determine relevancy based on a number of factors. For instance, example relevancy factors may include relevancy based on merchant type (e.g., jeans may be relevant to a department store but not relevant to a pet store); relevancy based on whether the merchant already carries certain product brands or product categories (e.g., a particular product from a particular brand that is already carried by the merchant—although the merchant doesn't already carry the particular product—may be more relevant than a product from a brand that is not already carried by the merchant); relevancy based on similarities between identified product preferences and the products already carried by the merchant (e.g., products that are similar to products already carried by the merchant may be more relevant than products with no similarities when compared to the products already carried by the merchant); and relevancy based on potential conflicts of interest (e.g., products that compete with products already carried by the merchant may be less relevant than products that do not compete with the merchant's current products).

To illustrate, the merchant insights manager 206 may determine, based on user profiles for identified users, that a number of the identified users have purchased a particular brand of shampoo online. Further, the merchant insights manager 206 may determine that the particular brand of shampoo is relevant to the merchant and fits within the merchant type (e.g., the merchant is hair salon or otherwise offers hair care products to customers). The merchant insights manager 206 may also analyze the merchant profile to determine whether the merchant already offers the particular brand of shampoo. If so, the merchant insights manager 206 may provide information in a merchant insight as to why users are purchasing the particular brand of shampoo online rather than at the merchant's retail location. If not offered by the merchant, the merchant insights manager 206 can analyze the merchant profile to determine whether any restrictions exist that would prevent the merchant from offering the particular brand of shampoo (e.g., based on an exclusivity agreement).

In some example embodiments, the merchant insights manager 206 may determine that the identified product preferences do not necessarily fit with the type of the merchant, but would complement the merchant's product offerings. To illustrate, the merchant insights manager 206 can determine that identified customers of a clothing store purchase lip balm on a regular basis online. While lip balm may not "fit" a clothing store (i.e., in that lip balm is not clothing), lip balm may still be an acceptable product because it can, for instance, be placed at the registers of the clothing store, and can thereby serve as a complementary product that does not conflict with the merchant's current products and may benefit the merchant by creating additional product conversions while increasing customer satisfaction.

Once the merchant insights manager 206 has identified one or more common and relevant product preferences from the merchant's users, the merchant insights manager 206 can provide one or more merchant insights to the merchant based on the product preferences. In particular, the merchant insights manager 206 can generate merchant insights based on the identified customers, the user profiles for the identified customers, and the product preferences of the customers. Among other things, the merchant insights manager 206 may provide the merchant with recommendations regarding additional products that the merchant could carry and in which the merchant's customers would likely be interested. The merchant insights manager 206 can include any other potentially helpful information within the merchant insights based on the user profiles for the identified customers, such as demographic information for the customers, employment information for the customers, pricing information for any recommended products, online sales statistics for the customers and/or recommended products, and/or any other information that may help the merchant to obtain additional business from the customers.

The merchant insights manager 206 can include a number of insights along with a variety of information to a merchant in the merchant insights. For example, the merchant insights may be a report of information and/or recommendations identified as likely being helpful for the merchant. In particular, the merchant insights manager 206 may include a number of recommendations regarding a product, product brand, and/or product category in the merchant insights. For instance, the merchant insights can include a recommendation for a merchant to add a product, product brand, and/or product category to a retail location. Furthermore, the merchant insights may include instructions regarding where to place the added product within the retail location. To illustrate foregoing, the merchant insights manager 206 may recommend, by way of merchant insights, that a merchant add a particular brand of toilet paper based on a number of identified users buying the brand of toilet paper elsewhere and the retail location not carrying the brand of toilet paper.

In additional embodiments, the merchant insights manager 206 can provide, by way of merchant insights, enhanced recommendations to a merchant. For example, the merchant insights manager 206 may provide a merchant with information that allows the merchant to determine whether to add a recommended product or modify current product offerings to increase product conversions. To illustrate, based on the merchant insights manager 206 determining that users visit a particular area of the retail location more frequently or stay in the particular area for longer durations of time, the merchant insights manager 206 may include a recommendation to place a preferred product in the particular area. For instance, the merchant insights may indicate to the merchant to add a product frequently purchased online by users to an end cap in the particular area. As another example, the merchant insights may indicate to a merchant to move a product that the merchant currently offers, but that identified users purchase online, to an area where the identified users frequently visit, or to a higher traffic area based on the obtained presence data.

In some example embodiments, the merchant insights manager 206 can include, in merchant insights, statistical information about a product, product brand, and/or product category. For example, the merchant insights manager 206 can include statistical information corresponding to a product brand recommended to the merchant. To illustrate, the merchant insights manager 206 may provide total sales for the product brand over a time period (e.g., all time, past year, past month), where identified users are otherwise purchasing the product brand (e.g., online websites, such as Amazon.com, Wal-Mart.com, eBay, etc.), price points for the product brand (e.g., average price, most common prices, price ranges, mean prices, median prices, shipping costs, tax, etc.), how frequently an identified user purchases the product brand (e.g., weekly, monthly, every two months, four times a year, etc.), whether a product brand is seasonal (e.g., when peak purchase times are for the product brand, such as during summer months), and other statistics associated with the recommended product brand. FIG. 5 below illustrates and discusses various non-limiting examples of information that merchant insights manager 206 can present to a merchant as merchant insights.

The merchant insights manager 206 can also include information corresponding to the identified users in one or more merchant insights. For example, the merchant insights manager 206 may provide the merchant, in merchant insights, with the number of users who visited the merchant's retail location, or a specific area, during a specified time period (e.g., 55 users visited the downtown location last month, 4,000 users visited locations located in Nevada last week, 200 users have lingered over 15 minutes in the hardware department in the last two weeks, etc.), common attributes shared between the identified users (e.g., 33% of identified users enjoy outdoor activities, 45% of identified users buy organic food, the majority of identified users belong to a social networking group or professional group, etc.), demographics of the identified users (80% of identified users are female, 28% of identified users are over the age of 65, 20 users live within 2 miles of the downtown location, etc.), time of visits (e.g., on weekdays: 15% visit before 11 am, 25% visit between 11 am and 2 pm, 20% visit between 2 pm and 5 pm, 40% visit from 5 pm to closing), etc.

Once the merchant insights manager 206 has generated merchant insights, the merchant insights manager 206 can provide the merchant insights to the merchant, as described above. In presenting the merchant insights to the merchant, the merchant insights manager 206 may determine how often to provide or update merchant insights. For example, the merchant insights manager 206 may send merchant insights at regular intervals, such as once per month. Alternatively, the merchant insights manager 206 may send merchant insights when a threshold number of identified users are met. For example, each time 100 identified users purchase a product online, the merchant insights manager 206 may generate merchant insights for the product to send to the merchant.

In additionally or alternative embodiments, the merchant insights manager 206 may generate merchant insights upon receiving a request from the merchant. For example, a merchant may request merchant insights for a product category and the merchant insights manager 206 may generate merchant insights for the product category, or one or more products or product brands, within the product category. This may be beneficial to the merchant if the merchant is considering expanding a product line, adding a new type of product category, or evaluating sales for a particular product.

As illustrated in FIG. 2 and described above, the merchant insights system 101 may include a storage manager 208. The storage manager 208 may assist in storing and recalling user profile data 212 and merchant profile data 214. User profile data 212 can correspond to data representative of a user's social networking profile (or user profile), as described above. Similarly, the merchant profile data 214 can correspond to data representative of a merchant profile. For example, merchant profile data 214 can correspond to products, product brands, and product categories associated with the merchant, as described above.

Figure 3:
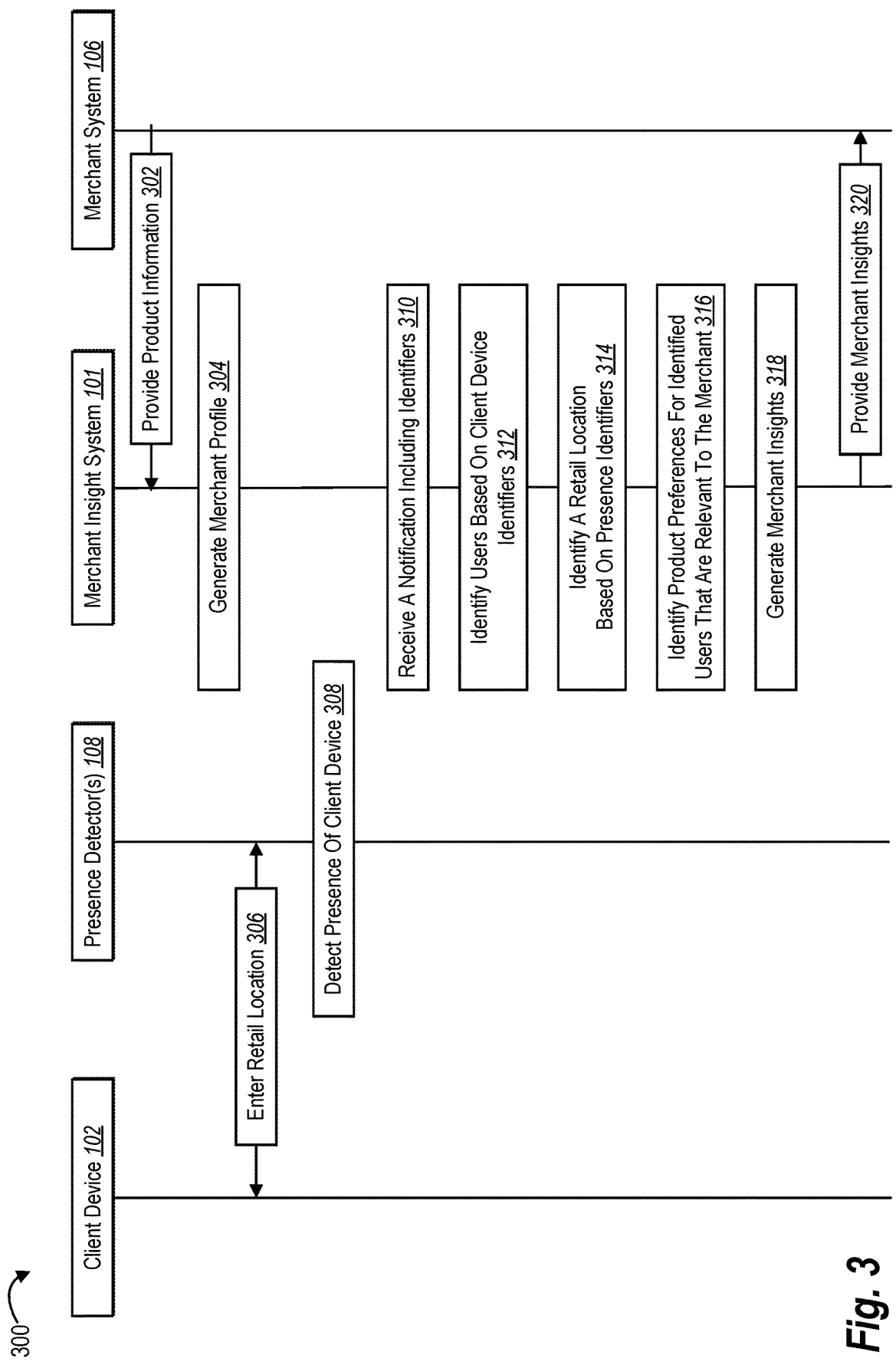
FIG. 3 illustrates a sequence-flow method showing interactions between a client device, presence detector(s), a merchant insights system, and a merchant system in accordance with one or more embodiments.

FIG. 3 illustrates an example sequence-flow method 300 showing interactions between a client device 102, one or more presence detector(s) 108, a merchant insights system 101, and a merchant system 106, in accordance with one or more embodiments disclosed herein. In one or more embodiments, the client device 102, the one or more presence detectors 108, the merchant insights system 101, and the merchant system 106 can be example embodiments of the corresponding elements described in connection with FIGS. 1 and 2. For example, as described above, the presence detectors 108 may send detection notifications to the merchant insights system 101.

The method 300 of FIG. 3 illustrates an example method of providing merchant insights to a merchant. To illustrate, in step 302, the merchant system 106 provides product information to the merchant insights system 101. For example, the merchant system 106 may send one or more feeds to the merchant insights system 101 that include product information (a product's name, brand, category, price, description, etc.), product inventories for a retail location (e.g., products offered, product identification numbers, the total number of products, the number of products in storage, product turnover rate, etc.), product location (e.g., one or more specific areas where the product is located), product promotions (e.g., sales, specials, deals, promotions, etc. associated with the product), etc.

In step 304, the merchant insights system 101 generates a merchant profile. For example, as described above, the merchant insights system 101 can create a social networking profile for the merchant that includes the product information received from the merchant system 106. Thus, a merchant profile for a merchant can include what products a merchant offers, product brands associated with those products, and where those products are located within a merchant's retail location.

Step 306 illustrates a client device 102 entering a retail location of a merchant (e.g., coming within communication range of the presence detector 108). As described above, a user may be associated with the client device 102. For example, the client device 102 may be a mobile device such as a smartphone or tablet carried by the user. Further, when a user enters the merchant's retail location, the presence of the user's client device 102 may be detected.

In particular, as illustrated in step 308, one or more presence detectors 108 detect the presence of the client device 102 when the user enters the retail location of the merchant with the client device 102. For example, a first presence detector may detect when a user enters the retail location. Further, additional presence detectors may detect when the user visits different areas of the retail location, such as various departments within a department store.

Step 310 illustrates the merchant insights system 101 receiving a notification including one or more identifiers. The merchant insights system 101 may receive the notification from one or more presence detectors 108 and/or the client device 102. Each notification can include a client device identifier for the client device 102, a user identifier for the user, an identifier for the presence detector(s) 108, and/or an identifier for the merchant. For example, one of the identifiers for a presence detector 108 may indicate the merchant and/or retail location in which the presence detector is located (e.g., MACY'S downtown location). Another identifier for the presence detector 108 may indicate a specific area in which the presence detector is located (e.g., perfume counter). The presence detector 108 and/or client device 102 may send a detection notification to the merchant insights system 101 including a unique identifier for the location of the presence detector 108.

In step 312, the merchant insights system 101 identifies users based on the identifiers received from the one or more presence detectors 108 and/or the client device 102. For example, the merchant insights system 101 may look up a user identifier or a client device identifier in a database of identifiers (e.g., a database of user profiles) to identify the user with which the client device 102 is associated. In addition, the merchant insights system 101 may identify the merchant and/or retail location where the user visited based on the presence detector identifier(s), as shown in step 314. Further, the merchant insights system 101 may determine the areas the user visits within the merchant's retail location based one or more detection notifications received for the presence detectors 108. In addition, based the detection notifications, the merchant insights system 101 can determine how long users visit in each specific area. In some instances, the user's privacy settings may permit, limit, or deny an ability of the merchant insights system 101 to track a user's actions, store user information, and/or otherwise use or interact with a user's information, as described above.

Step 316 illustrates the merchant insights system 101 identifying product preferences for the identified users that are relevant to the merchant. As described above, the merchant insights system 101 may analyze users profiles of the identified users to determine one or more product preferences. The merchant insights system 101 may then determine which product preferences are relevant to the merchant, by comparing the identified product preferences to information in the merchant's profile. For example, as described above, the merchant insights system 101 may determine whether a preferred product, product brand, and/or product category fits the merchant type, is currently offered by the merchant at a particular retail location, and/or is available for the merchant to offer.

The merchant insights system 101 may generate merchant insights to provide to the merchant based on the relevancy determination. For example, in step 318, the merchant insights system 101 generates merchant insights for a merchant. As described above, merchant insights may provide the merchant with information that is otherwise unavailable to the merchant, which allows the merchant to increase product conversions at one or more of the merchant's retail locations. An example of merchant insights is provided and discussed below in connection with FIG. 5.

After generating the merchant insights, the merchant insights system 101 may provide the merchant insight to the merchant. For example, as illustrated in step 320, the merchant insights system 101 provides the merchant insights to the merchant system 106. As described above, the merchant insights system 101 may provide the merchant insights to the merchant on a periodic basis (e.g., bi-weekly, monthly, quarterly, etc.). Additionally, or alternatively, the merchant insights system 101 may provide merchant insights upon request by the merchant.

Figure 4:
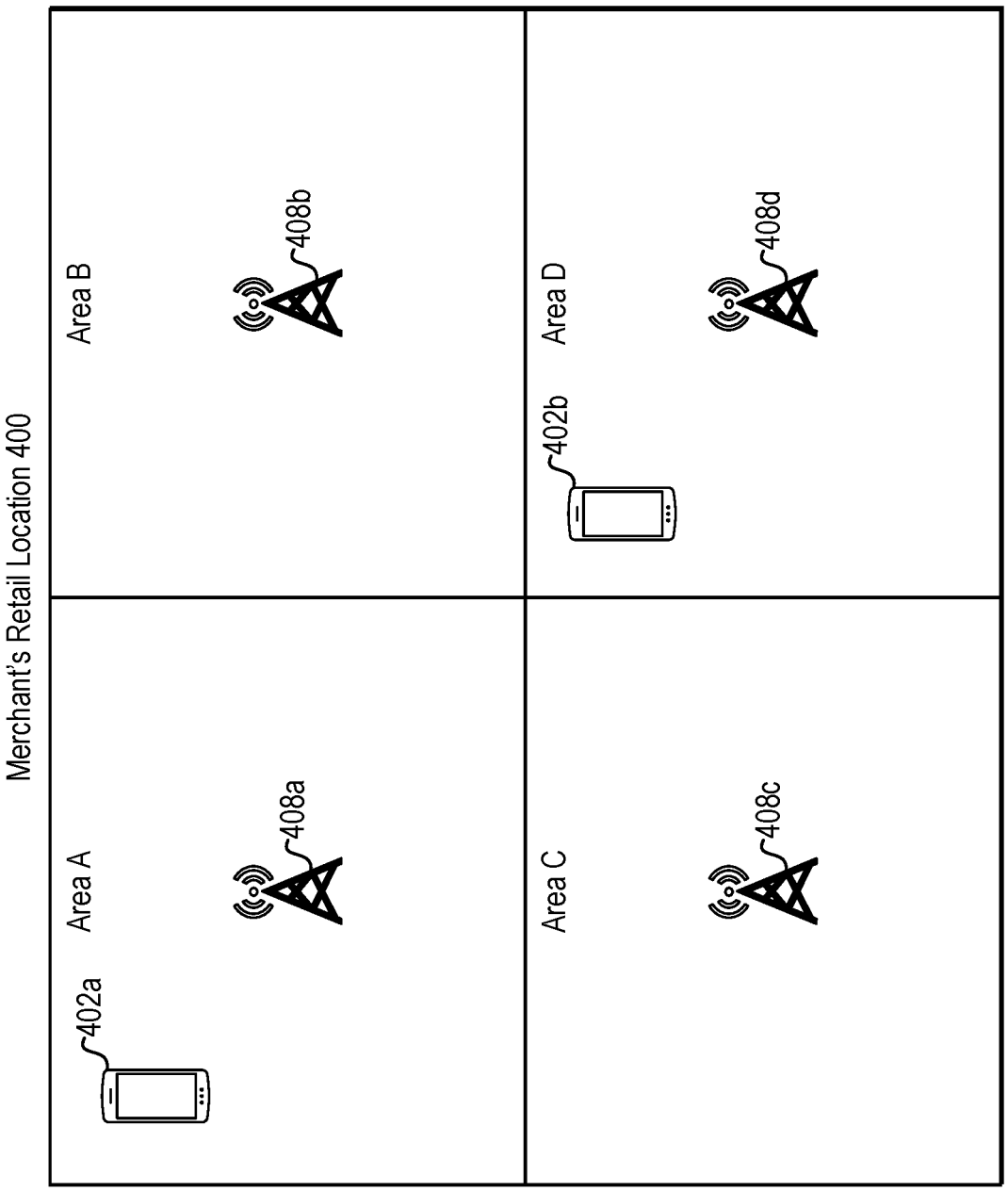
FIG. 4 illustrates a schematic diagram of a retail location associated with a merchant in accordance with one or more embodiments.

FIG. 4 illustrates a schematic diagram of a retail location 400 associated with a merchant, in accordance with one or more embodiments described herein. The retail location 400 may include a number of areas. An area can correspond to a different section within the retail location 400 (e.g., a department, a level or floor of a multi-level location, etc.). Further, an area may correspond to a strategic point within the retail location, such as the entrance of the retail location 400. In addition, an area may vary in size. For example, an area may include multiple departments within the retail location 400. Alternatively, an area may correspond to a small section of the retail location 400, such as a display or an end cap.

As illustrated in FIG. 4, the retail location 400 includes Area A, Area B, Area C, and Area D. As one example, Area A may correspond to the entrance and checkout areas of the retail location 400. Area B may correspond to the women's clothing department. Area C may correspond to the toddlers, children, juniors, and teens clothing departments in a department store. Area D may correspond to the men's clothing department, including a product display for men's ties within a men's clothing department.

Each area within the retail location 400 can include one or more presence detectors 408a-d (referred to collectively herein as "presence detectors 408"). For example, Area A can include multiple presence detectors that detect when a client device comes within range of the one or more presence detectors. For example, one presence detector in Area A can detect when a user enters the retail location 400 while another presence detector can detect when a user visits a customer service desk or sales counter within Area A. For simplicity, however, only one presence detector is displayed per area.

As illustrated in FIG. 4, a user may visit the retail location 400. For example, a first user associated with a first client device 402a may enter the retail location 400. Upon entering Area A, presence detector 408a may communicate with the first client device 402a associated with the first user. Upon detecting the first client device 408a, the presence detector 408a and/or the first client device 408a may send a notification to a merchant insights system. As described above, the detection notification may include an identifier for the first client device 402a and/or the associated user, as well as one or more identifiers for the presence detector 408a. In addition, the detection notification may include a timestamp of when the detection occurred. Further, an additional notification may be sent to the merchant insights system when the first user exits the retail location 400.

In some embodiments, a presence detection notification can include when a client device was first detected, when the detected client device left the detection range of the presence detector, and/or a distance of the detected client device while within the detection range. To illustrate, presence detector 408d may detect that a second client device 402b entered into Area D (e.g., the men's clothing department). Presence detector 408d may cause a notification to be sent to the merchant insights system indicating how long the second client device 402b stayed in Area D and if the second client device 408b lingered in a particular part of Area D. For example, presence detector 408d may indicate that the second client device 402b spent five minutes in front of presence detector 408d at a range of two feet. Using this information in the detection notification, the merchant insights system may determine that not only did a second user associated with the second client device 402b visit the men's clothing department, but that the second user also lingered in front of the tie display for five minutes.

The following is an illustrative example of how the merchant insights system can provide merchant insights to the merchant. As the first user and the second user may move about the retail location 400, the presence detectors 408 in each area may detect each user's movements. The presence detectors 408 may send detection notifications (or cause detection notifications to be sent by client devices 402a-b) for each user to the merchant insights system. The merchant insights system may identify each user, access the user profile associated with each user, and/or update the user profile to indicate the user's movements and browsing habits within the retail location 400. Subsequently, the merchant insights system may analyze the user profiles for the first and second user to identify common product preferences. The common product preferences may be based on user interactions with third-party merchants, as described above. The merchant insights system may also correlate common product preferences with the merchant's profile to determine if one or more common product preferences are relevant to the merchant. Further, the merchant insights system may then provide merchant insights to the merchant based on the common product preferences that are relevant to the merchant.

FIG. 5 illustrates a graphical user interface 500 (or "GUI 500") showing example merchant insights in accordance with one or more embodiments disclosed herein. The GUI 500 illustrates merchant insights for a merchant called "Evening Star's Book Boutique." The GUI 500 includes contextual information, product information, product recommendations, and product statistics.

As illustrated in the GUI 500 of FIG. 5, the merchant insights include contextual information such as identification of the retail location (e.g., downtown) to which the merchant insights correspond, the time period (e.g., April 2014) corresponding to the merchant insights, and the number of identified users on which the merchant insights are based (e.g., 70 customers). In some example embodiments, the contextual information may be interactive (e.g., the merchant can adjust the contextual information). For example, the merchant may change the time period to another month (e.g., August 2014) or broaden the time period to span a number of months (e.g., past six months, year-to-date, etc.). Further, the merchant may desire to add or remove retail locations. As the merchant interacts with the contextual information, the merchant insights system may update (e.g., regenerate) the other fields of the GUI 500.

In addition, the GUI in FIG. 5 illustrates product information and recommendations as part of the merchant insights. For example, the merchant insights may include one or more recommended products (e.g., Books by John Smith) associated with a particular brand (e.g., Solitude Publishing). Alternatively, the merchant insights may recommend a product independent of a product brand. Further, the merchant insights may recommend a product brand without providing a recommendation for a specific product. For example, the merchant insights may indicate all books published by Solitude Publishing. As described above, product and/or product brand recommendations may be based on product preferences for identified users that relate to the merchant.

The merchant insights can also include descriptive recommendations. For example, the merchant insights may recommend that Evening Star's Book Boutique offer books by author John Smith, which are published by Solitude Publishers. Further, the merchant insights may provide support for product, product brands, and/or product category recommendation. For example, as shown in GUI 500, the merchant insights may indicate that 75% of identified users who visit the downtown location purchase John Smith books online. Accordingly, if the merchant offers books by John Smith, the merchant may be able to sell additional books to existing customers, which may lead to increases sales to the merchant and increased convenience to the merchant's customers.

In addition, as illustrated in GUI 500, the merchant insights may include product statistics. For example, the merchant insights can provide details regarding where users are otherwise purchasing a recommended product (i.e., John Smith books). For instance, the merchant insights can display a percentage breakdown showing the third-party online merchants from which users purchase John Smith books.

Further, as part of the product statistics, the merchant insights may include financial details, such as total sales, the average price, price range, lowest price and highest price, median price, shipping costs, taxes, the total sales, etc., of the recommended product. Further, in one or more embodiments, the merchant insights can provide graphics illustrating product statistics, such as a graph or chart showing prices users paid for the recommended product and/or total sales of the recommended product over time.

The merchant insights may also provide the frequency that identified users purchased the recommended product as well as peak times when identified users purchased the recommended product. For example, as shown in GUI 500, the merchant insights indicates to the merchant that identified users bought a John Smith book, on average, once every 6 months. The merchant insights also may indicate to the merchant that John Smith books purchases peaked from January through March.

As discussed above, the merchant insights can also include information about the identified users. For example, the merchant insights system can provide the merchant with information regarding other product preferences common to the identified users. For instance, the merchant insights may indicate to the merchant that a majority of the identified users drink coffee and/or prefer a particular brand of coffee. As such, the merchant insights system 101 may provide a merchant insight recommending the merchant offer that particular brand of coffee to its customers to incentivize current customers to visit the merchant more often and/or stay at the merchant's retail location for longer durations.

Accordingly, the merchant insights system can provide merchant insights to a merchant based on browsing and shopping behaviors of its customers that occur outside of the merchant's retail location, which provides the merchant with information the merchant cannot otherwise access. Thus, by using the information on the merchant insights, a merchant can determine whether offering a recommended product, product brand, and/or product category may lead to increase product conversation and/or increased profits.

Figure 6:
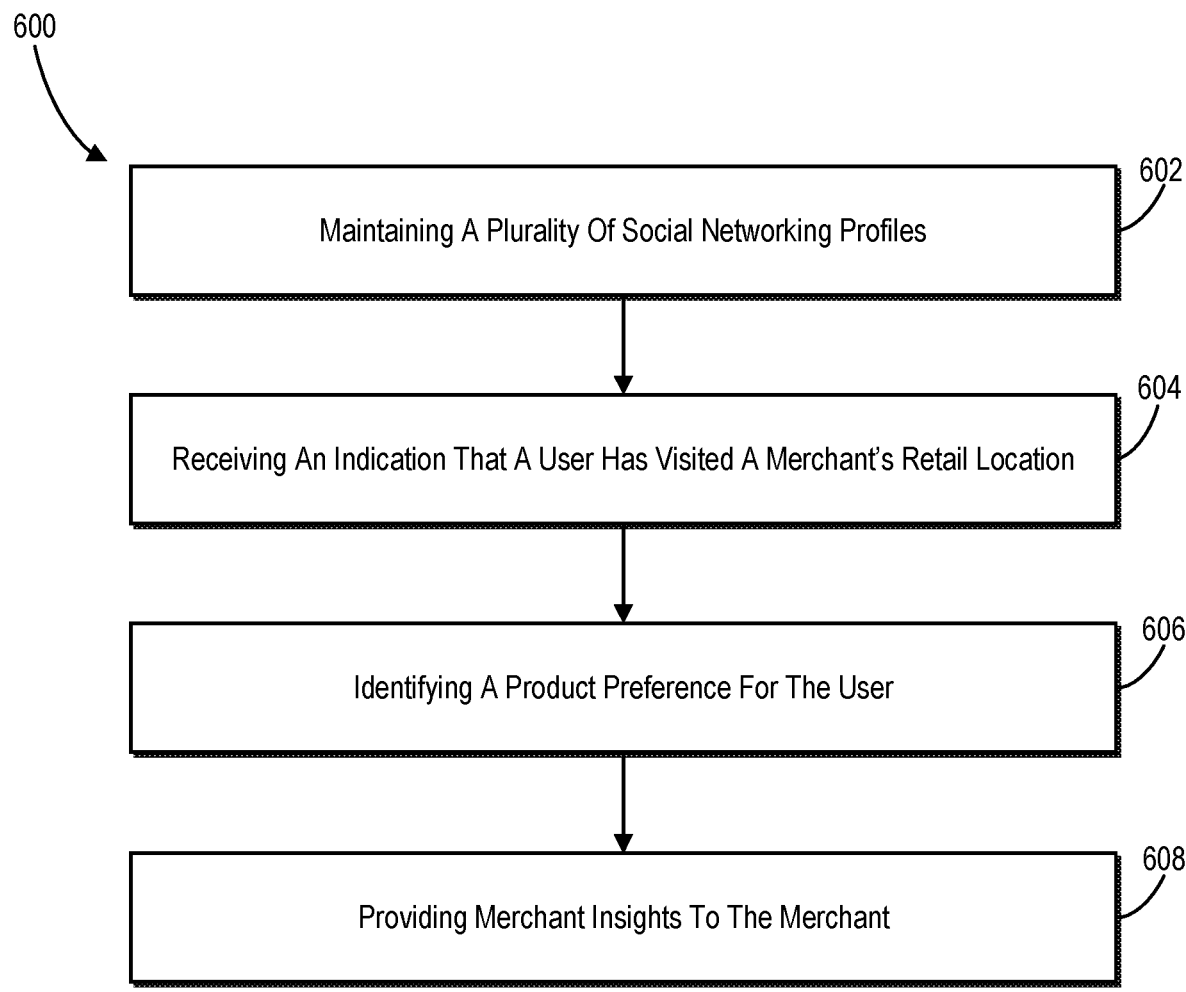
FIG. 6 illustrates a flowchart of an exemplary method for providing merchant insights to a merchant in accordance with one or more embodiments.
Figure 7:
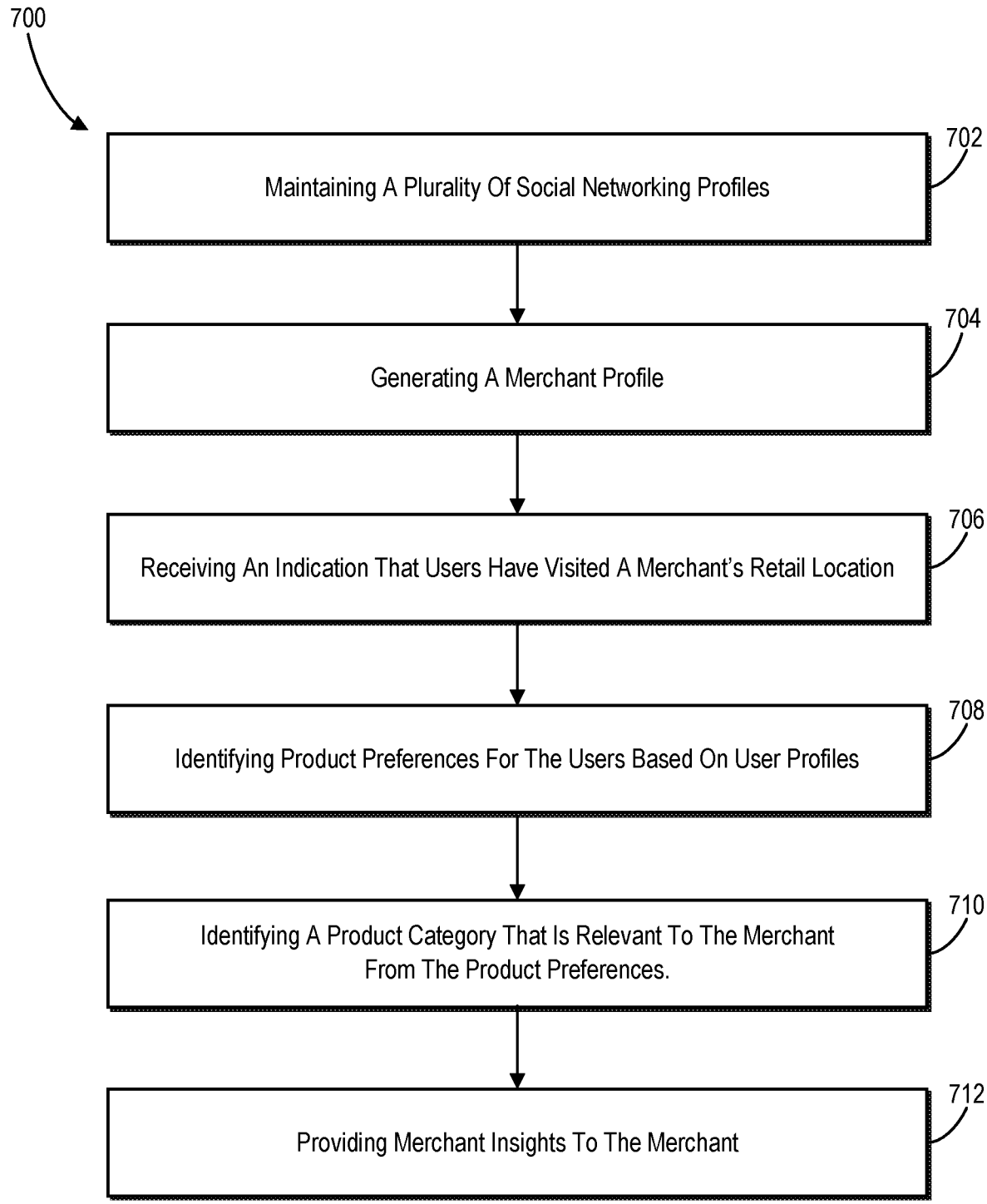
FIG. 7 illustrates a flowchart of an exemplary method for providing merchant insights to a merchant based on product relevancy in accordance with one or more embodiments.

FIGS. 1-5, the corresponding text, and the examples, provide a number of different systems, devices, and graphical user interfaces for providing merchant insights to a merchant. In addition to the foregoing, embodiments disclosed herein also can be described in terms of flowcharts comprising acts and steps in a method for accomplishing a particular result. For example, FIGS. 6-7 illustrate flowcharts of exemplary methods in accordance with one or more embodiments disclosed herein. The methods described in relation to FIGS. 6-7 can be performed with less or more steps/acts or the steps/acts can be performed in differing orders. Additionally, the steps/acts described herein can be repeated or performed in parallel with one another or in parallel with different instances of the same or similar steps/acts.

FIG. 6 illustrates a flowchart of an example method 600 for providing merchant insights to a merchant in accordance with one or more embodiments disclosed herein. Method 600 can be implemented by system 100 and/or executed by the merchant insights system 101 and/or social networking system 104. The method 600 includes an act 602 of maintaining a plurality of social networking profiles. In particular, the act 602 may include maintaining a plurality of social networking profiles, each social networking profile comprising product preferences for a corresponding user. For example, the act 602 may include the profile manager 202 of the merchant insights system 101 maintaining one or more social networking profiles corresponding to users of a social networking system 104, in any suitable manner, as disclosed herein.

In addition, the method 600 further includes an act 604 of receiving an indication that a user has visited a merchant's retail location. In particular, the act 604 may include receiving an indication that one or more users from the plurality of users have visited a physical location associated with a merchant. For example, the act 604 may include a presence detection manager 204 of the merchant insights system 101 receiving a notification indicating that one or more client devices corresponding to one or more social networking users have been detected at a retail location associated with a merchant, as described herein.

Further, the method 600 includes an act 606 of identifying a product preference for the user. In particular, the act 606 may include identifying, based on social networking profiles associated with the one or more users, one or more product preferences for the one or more users. For example, the act 606 may include a merchant insights manager 206 of the merchant insights system 101 identifying product preferences for social networking users identified at the retail location associated with the merchant, in any suitable manner disclosed herein.

The method 600 also includes an act 608 of providing merchant insights to the merchant. In particular, the act 608 may include providing merchant insights to the merchant based on the identified one or more product preferences. In particular, the act 608 may include the merchant insights manager 206 of the merchant insights system 101 providing merchant insights to the merchant, in any suitable manner described herein.

FIG. 7 illustrates a flowchart of another example method 700 for providing merchant insights to a merchant based on relevancy in accordance with one or more embodiments disclosed herein. Method 700 can be implemented by system 100 and/or executed by the merchant insights system 101 and/or social networking system 104. The method 700 includes an act 702 of maintaining a plurality of social networking profiles. In particular, the act 702 may include maintaining a plurality of social networking profiles, each social networking profile comprising product preferences for a corresponding user. For example, the act 702 may include the profile manager 202 of the merchant insights system 101 maintaining one or more social networking profiles for users of a social networking system 104, in any suitable manner, as disclosed herein.

Further, the method 700 includes an act 704 of generating a merchant profile. In particular, the act 704 may include generating a merchant profile based on product information received from a merchant. For example, the act 704 may include the profile manager 202 of the merchant insights system 101 generating a merchant profile from product information provided by a merchant, as described herein.

Additionally, the method 700 includes an act 706 of receiving an indication that users have visited a merchant's retail location. In particular, the act 706 may include receiving an indication that one or more users from the plurality of users have visited a physical location associated with a merchant. For example, the act 706 may include a presence detection manager 204 of the merchant insights system 101 receiving a notification indicating that one or more client devices corresponding to one or more social networking users have been detected at a retail location associated with a merchant, as described herein.

Further, the method 700 includes an act 708 of identifying a product preference for the users based on user profiles. In particular, the act 708 may include identifying, based on social networking profiles associated with the one or more users, one or more product preferences for the one or more users. For example, the act 708 may include a merchant insights manager 206 of the merchant insights system 101 identifying product preferences for social networking users identified at the retail location associated with the merchant, in any suitable manner disclosed herein.

In addition, the method 700 includes an act 710 of identifying a product category that is relevant to the merchant from the product preferences. In particular, the act 710 may include identifying, from the identified product preferences for the one or more users, a product category that is of interest to the one or more users and is relevant to the merchant. For example, the act 710 can include the merchant insights manager 206 of the merchant insights system 101 identifying product preferences of social networking users, who have visited the merchant's retail location, that relate to the merchant, in any suitable manner described herein.

The method 700 also includes an act 712 of providing merchant insights to the merchant. In particular, the act 712 may include providing merchant insights to the merchant corresponding to the product category. In particular, the act 712 may include the merchant insights manager 206 of the merchant insights system 101 providing merchant insights to the merchant for one or more products, product brands, and/or product categories, based on product preferences of social networking users, in any suitable manner described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
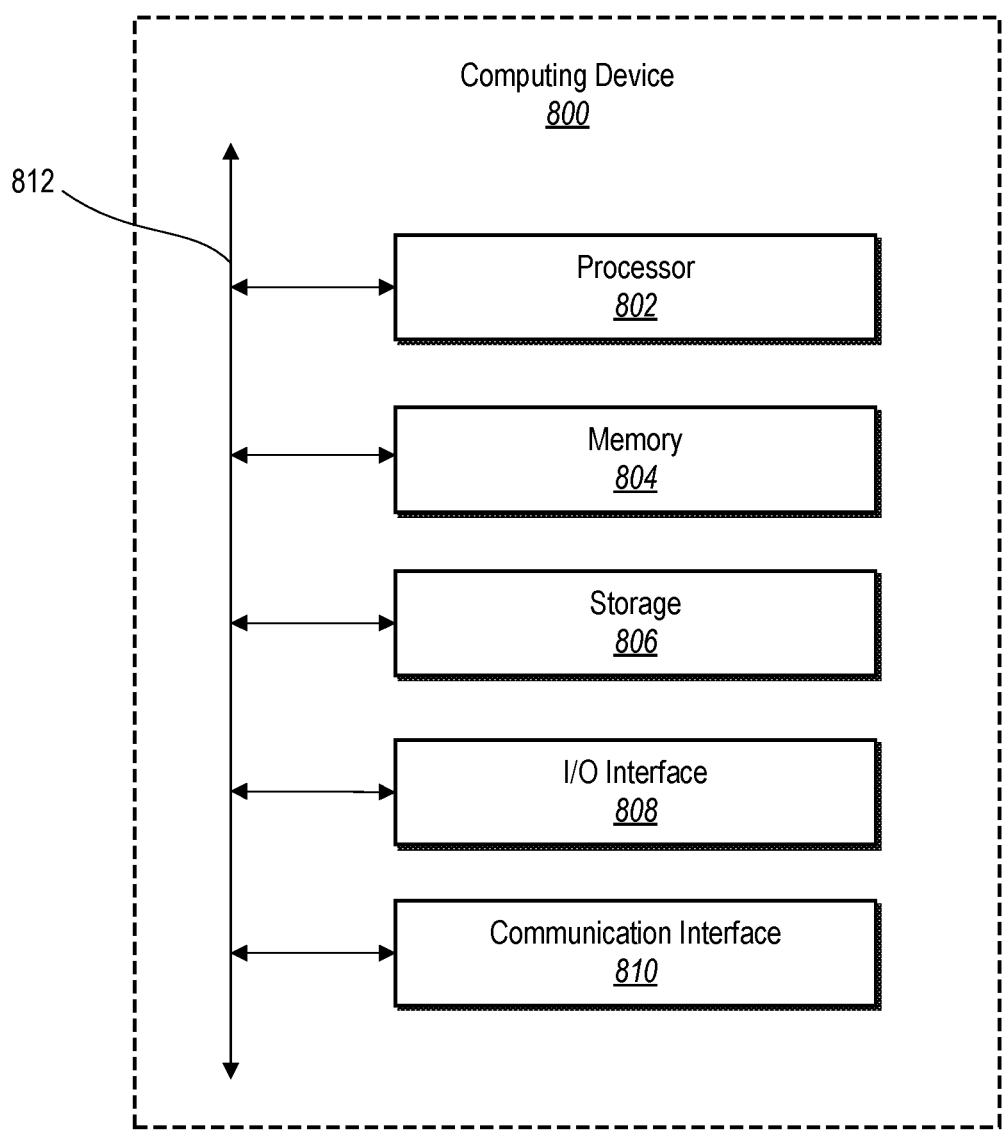
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system 100 and/or the merchant insights system 101 and/or the social networking system 104. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 9:
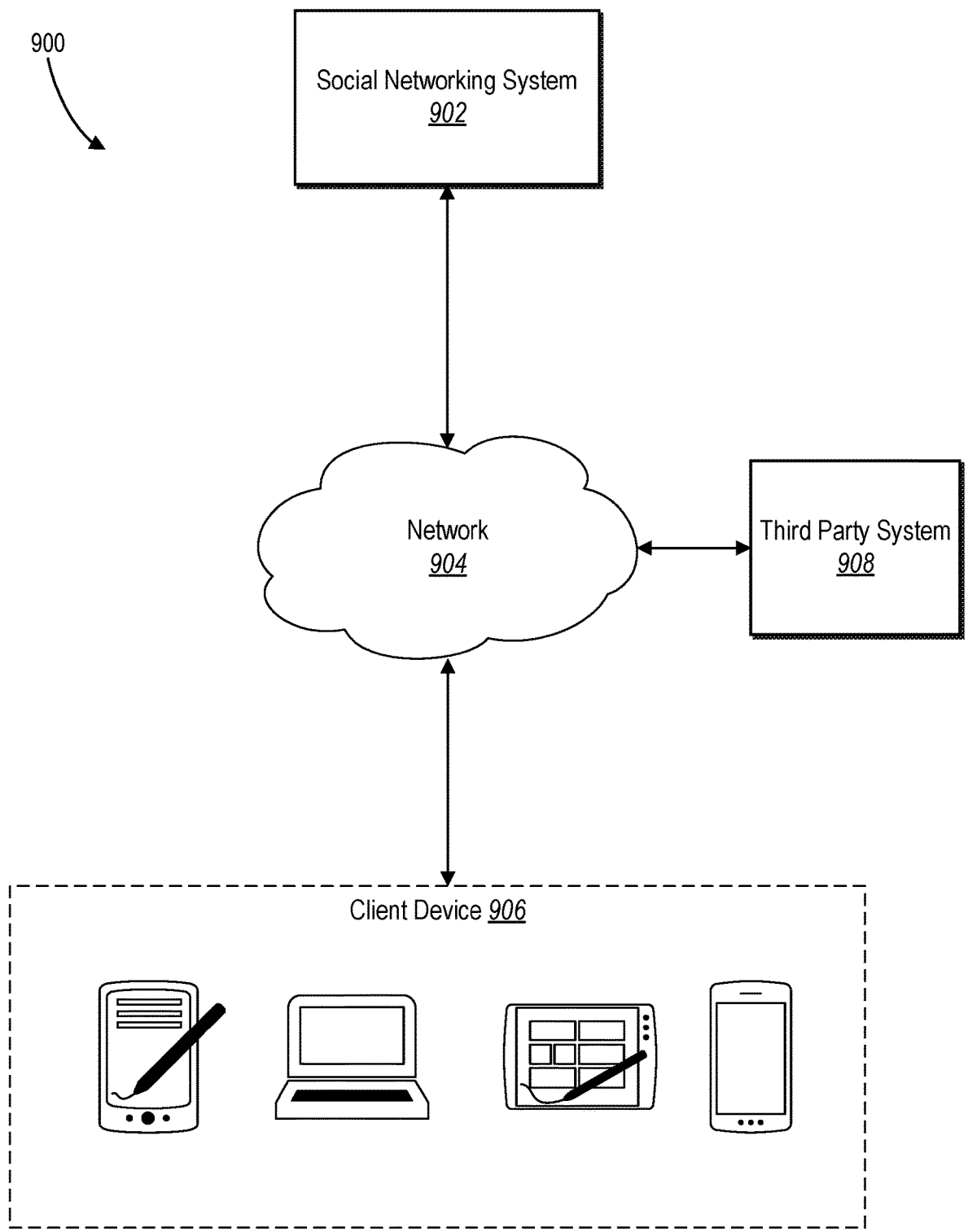
FIG. 9 is an example network environment of a social networking system in accordance with one or more embodiments.

FIG. 9 illustrates an example network environment 900 of a social-networking system. Network environment 900 includes a client system 906, a social-networking system 902, and a third-party system 908 connected to each other by a network 904. Although FIG. 9 illustrates a particular arrangement of client system 906, social-networking system 902, third-party system 908, and network 904, this disclosure contemplates any suitable arrangement of client system 906, social-networking system 902, third-party system 908, and network 904. As an example and not by way of limitation, two or more of client system 906, social-networking system 902, and third-party system 908 may be connected to each other directly, bypassing network 904. As another example, two or more of client system 906, social-networking system 902, and third-party system 908 may be physically or logically co-located with each other in whole, or in part. Moreover, although FIG. 9 illustrates a particular number of client systems 906, social-networking systems 902, third-party systems 908, and networks 904, this disclosure contemplates any suitable number of client systems 906, social-networking systems 902, third-party systems 908, and networks 904. As an example and not by way of limitation, network environment 900 may include multiple client system 906, social-networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social-networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 8. A client system 906 may enable a network user at client system 906 to access network 904. A client system 906 may enable its user to communicate with other users at other client systems 906.

In particular embodiments, client system 906 may include a web browser 932, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 902 may be a network-addressable computing system that can host an online social network. Social-networking system 902 may generate, store, receive, and send social-networking data, such as, for example, user-profile data, concept-profile data, social-graph information, or other suitable data related to the online social network. Social-networking system 902 may be accessed by the other components of network environment 900 either directly or via network 904. In particular embodiments, social-networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social-networking system 902, or a third-party system 908 to manage, retrieve, modify, add, or delete, the information stored in data store.

In particular embodiments, social-networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 902 may provide users of the online social network the ability to communicate and interact with other users. In particular embodiments, users may join the online social network via social-networking system 902 and then add connections (e.g., relationships) to a number of other users of social-networking system 902 whom they want to be connected to. Herein, the term "friend" may refer to any other user of social-networking system 902 with whom a user has formed a connection, association, or relationship via social-networking system 902.

In particular embodiments, social-networking system 902 may provide users with the ability to take actions on various types of items or objects, supported by social-networking system 902. As an example and not by way of limitation, the items and objects may include groups or social networks to which users of social-networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 902 or by an external system of third-party system 908, which is separate from social-networking system 902 and coupled to social-networking system 902 via a network 904.

In particular embodiments, social-networking system 902 may be capable of linking a variety of entities. As an example and not by way of limitation, social-networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social-networking system 902. In particular embodiments, however, social-networking system 902 and third-party systems 908 may operate in conjunction with each other to provide social-networking services to users of social-networking system 902 or third-party systems 908. In this sense, social-networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 902 also includes user-generated content objects, which may enhance a user's interactions with social-networking system 902. User-generated content may include anything a user can add, upload, send, or "post" to social-networking system 902. As an example and not by way of limitation, a user communicates posts to social-networking system 902 from a client system 906. Posts may include data such as status updates or other textual data, location information, photos, videos, links, music or other similar data or media. Content may also be added to social-networking system 902 by a third-party through a "communication channel," such as a newsfeed or stream.

In particular embodiments, social-networking system 902 may include a variety of servers, sub-systems, programs, modules, logs, and data stores. In particular embodiments, social-networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 902 may also include suitable components such as network interfaces, security mechanisms, load balancers, failover servers, management-and-network-operations consoles, other suitable components, or any suitable combination thereof. In particular embodiments, social-networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 902 to one or more client systems 906 or one or more third-party system 908 via network 904. The web server may include a mail server or other messaging functionality for receiving and routing messages between social-networking system 902 and one or more client systems 906. An API-request server may allow a third-party system 908 to access information from social-networking system 902 by calling one or more APIs. An action logger may be used to receive communications from a web server about a user's actions on or off social-networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social-networking system 902. A privacy setting of a user determines how particular information associated with a user can be shared. The authorization server may allow users to opt in to or opt out of having their actions logged by social-networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
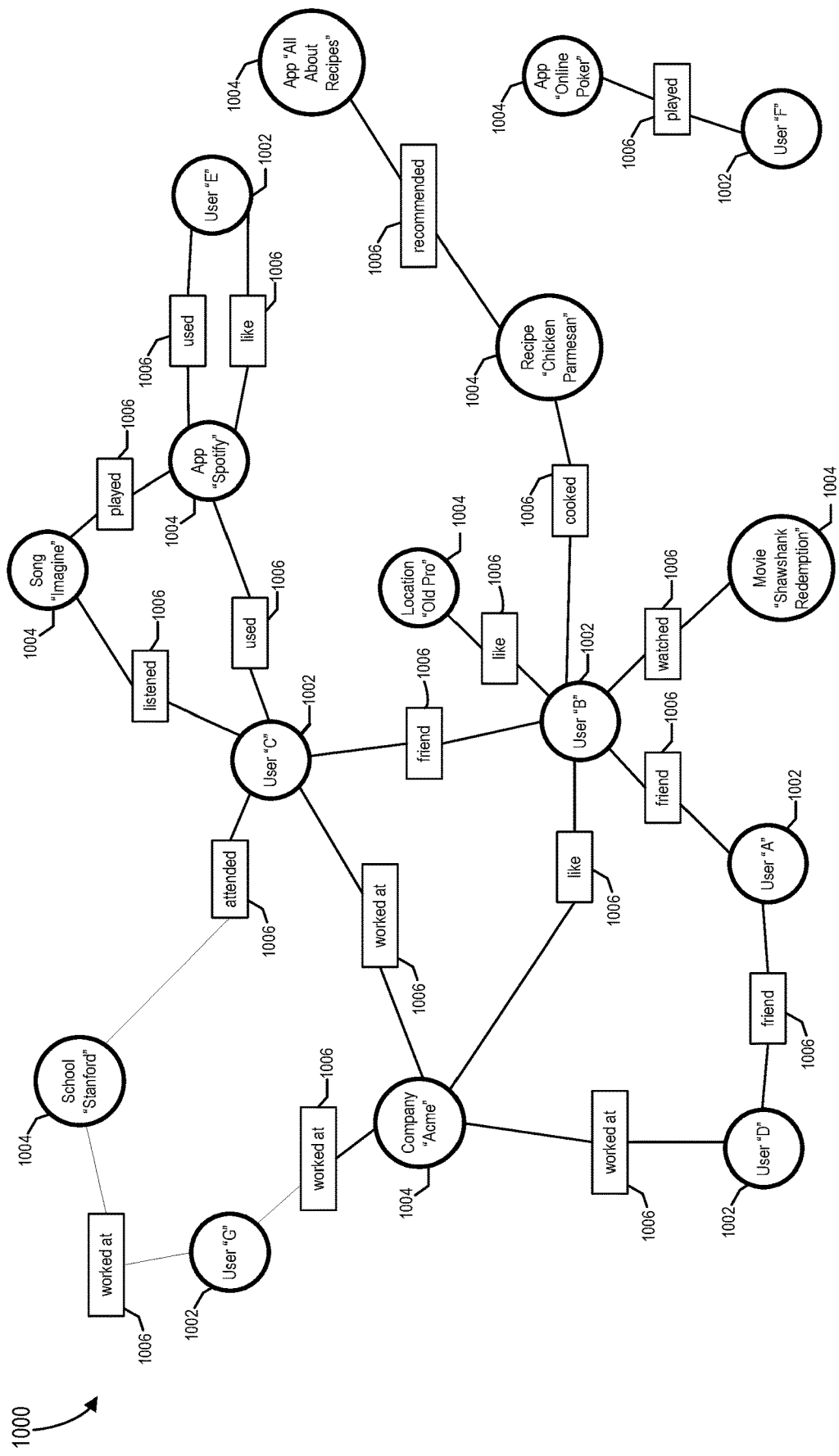
FIG. 10 illustrates a social graph in accordance with one or more embodiments.

FIG. 10 illustrates example social graph 1000. In particular embodiments, social-networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social-networking system 902. As an example and not by way of limitation, a user may be an individual (human user), an entity (e.g., an enterprise, business, or third-party application), or a group (e.g., of individuals or entities) that interacts or communicates with or over social-networking system 902. In particular embodiments, when a user registers for an account with social-networking system 902, social-networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 902. In particular embodiments, a user node 1002 may be associated with information provided by a user or information gathered by various systems, including social-networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social-networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social-networking system 902 a message indicating the user's action. In response to the message, social-networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 902 may send a "friend request" to the second user. If the second user confirms the "friend request," social-networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 902 may create a "favorite" edge or a "check in" edge in response to a user's action corresponding to a respective action. As another example and not by way of limitation, a user (user "C") may listen to a particular song ("Ramble On") using a particular application (SPOTIFY™, which is an online music application). In this case, social-networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY™) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social-networking system 902 a message indicating the user's liking of the concept associated with the concept-profile page. In response to the message, social-networking system 902 may create an edge 1006 between user node 1002 associated with the user and concept node 1004, as illustrated by "like" edge 1006 between the user and concept node 1004. In particular embodiments, social-networking system 902 may store an edge 1006 in one or more data stores. In particular embodiments, an edge 1006 may be automatically formed by social-networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. A user may play an advertisement with audio or video by selecting a component of the advertisement (like a "play button"). Alternatively, by selecting the advertisement, social-networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 902) or RSVP (e.g., through social-networking system 902) to an event associated with the advertisement. In addition or as an alternative, an advertisement may include social-networking-system context directed to the user. As an example and not by way of limitation, an advertisement may display information about a friend of the user within social-networking system 902 who has taken an action associated with the subject matter of the advertisement.

In particular embodiments, social-networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 902 may calculate a coefficient based on a user's actions. Social-networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social-networking system 902 may analyze a user's actions to determine whether one or more of the actions indicate an affinity for subject matter, content, other users, and so forth. As an example and not by way of limitation, if a user may make frequently posts content related to "coffee" or variants thereof, social-networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 902 may calculate a coefficient based on the type of relationship between particular objects. Referencing the social graph 1000, social-networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user node 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 902 may determine that the user has a higher coefficient with respect to the first photo than the second photo because having a tagged-in-type relationship with content may be assigned a higher weight and/or rating than having a like-type relationship with content. In particular embodiments, social-networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social-networking system 902 may determine that the user has a higher coefficient for the airport than the gas station based on the proximity of the airport to the user.

In particular embodiments, social-networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 902 may provide information that is relevant to user's interests and current circumstances, increasing the likelihood that they will find such information of interest. In particular embodiments, social-networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social-networking system 902 may calculate the coefficient (or access the coefficient information if it has previously been calculated and stored). In particular embodiments, social-networking system 902 may measure an affinity with respect to a particular process. Different processes (both internal and external to the online social network) may request a coefficient for a particular object or set of objects. Social-networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A computer-implemented method comprising:
   maintaining a plurality of social networking profiles for a plurality of users that comprise online purchases information;
   receiving one or more indications that a subset of users from the plurality of users have visited a physical location associated with a merchant;
   detecting, based on the one or more indications that the subset of users have visited the physical location associated with the merchant, a target area within the physical location associated with the merchant where the subset of users visited;
   identifying online purchases by the subset of users from social networking profiles associated with the subset of users;
   based on identifying the online purchases by the subset of users, comparing the online purchases to products carried at the physical location associated with the merchant to determine one or more additional products from the online purchases that are not carried at the physical location associated with the merchant;
   generating merchant insights comprising a recommendation to add the one or more additional products from the online purchases that are not carried at the physical location associated with the merchant to the target area within the physical location associated with the merchant; and
   providing the merchant insights comprising the one or more additional products to a client device associated with the merchant.

2. The computer-implemented method of claim 1, wherein the merchant insights further comprise a purchase summary of the online purchases by the subset of users that have visited the physical location associated with the merchant.

3. The computer-implemented method of claim 1, wherein providing the merchant insights to the merchant comprises providing one or more product preferences of the subset of users from the social networking profile associated with the subset of users.

4. The computer-implemented method of claim 3, further comprising:
   determining the products carried at the physical location associated with the merchant by analyzing a merchant profile associated with the merchant to determine that the merchant does not carry the one or more additional products of the online purchases at the physical location associated with the merchant; and
   providing the merchant insights to the client device associated with the merchant by providing a recommendation that the merchant introduce the one or more additional products to the target area at the physical location associated with the merchant.

5. The computer-implemented method of claim 4, further comprising:
   analyzing the one or more product preferences for the subset of users to determine a common product category preferred by the subset of users that have visited the physical location associated with the merchant;
   determine, based on analyzing the merchant profile, a specific area within the physical location associated with the merchant that corresponds to the determined common product category; and
   providing the merchant insights to the merchant by providing a recommendation to add products from the common product category preferred by the subset of users to the specific area within the physical location associated with the merchant.

6. The computer-implemented method of claim 1, further comprising detecting the target area within the physical location associated with the merchant where the subset of users have visited based on one or more presence detectors within the target area being triggered.

7. The computer-implemented method of claim 6, further comprising providing merchant insights to the merchant to add the one or more additional products of the online purchases to the target area within the physical location associated with the merchant is based on detecting the subset of users visiting the target area for at least a threshold amount of time.

8. The computer-implemented method of claim 7, further comprising:
   detecting, by the one or more presence detectors within the physical location associated with the merchant, one or more mobile devices associated with the subset of users at the physical location associated with the merchant; and receiving the one or more indications that the subset of users have visited the physical location associated with the merchant based on the one or more presence detectors detecting the one or more mobile devices associated with the subset of users at the physical location associated with the merchant.

9. The computer-implemented method of claim 8, further comprising detecting, by a first presence detector of the one or more presence detectors within the physical location associated with the merchant, that the subset of users have lingered for at least the threshold amount of time in the target area of the physical location associated with the merchant.

10. The computer-implemented method of claim 1, further comprising determining that a percentage of the subset of users have purchased the one or more additional products online.

11. A non-transitory computer-readable medium storing instructions that, when executed by at least one processor, cause a computer system to:

maintain a plurality of social networking profiles for a plurality of users that comprise online purchases information;

receive one or more indications that a subset of users from the plurality of users have visited a physical location associated with a merchant;

detect, based on the one or more indications that the subset of users have visited the physical location associated with the merchant, a target area within the physical location associated with the merchant where the subset of users visited;

identify online purchases by the subset of users from social networking profiles associated with the subset of users;

based on identifying the online purchases by the subset of users, compare the online purchases to products carried at the physical location associated with the merchant to determine one or more additional products from the online purchases that are not carried at the physical location associated with the merchant;

generate merchant insights comprising a recommendation to add the one or more additional products from the online purchases that are not carried at the physical location associated with the merchant to the target area within the physical location associated with the merchant; and provide the merchant insights comprising the one or more additional products to a client device associated with the merchant.

12. The non-transitory computer-readable medium of claim 11, further comprising instructions that cause the computer system to:

receive product information from the merchant; and
generate a merchant profile for the merchant based on the received product information.

13. The non-transitory computer-readable medium of claim 12, further comprising instructions that cause the computer system to determine a relevancy of the online purchases by the subset of users to the merchant.

14. The non-transitory computer-readable medium of claim 13, wherein instructions cause the computer system to the determine the relevancy of the online purchases by the subset of users to the merchant by comparing the online purchases by the subset of users that have visited the physical location to the merchant profile.

15. The non-transitory computer-readable medium of claim 13, further comprising instructions that cause the computer system to determine to provide the merchant insights to the merchant based on the relevancy of the online purchases by the subset of users.

16. A system comprising:
a processor; and
a non-transitory computer-readable storage medium storing instructions that, when executed by the processor, cause the system to:

maintain a plurality of social networking profiles for a plurality of users that comprise online purchases information;

receive one or more indications that a subset of users from the plurality of users have visited a physical location associated with a merchant;

detect, based on the one or more indications that the subset of users have visited the physical location associated with the merchant, a target area within the physical location associated with the merchant where the subset of users visited;

identify online purchases by the subset of users from social networking profiles associated with the subset of users;

based on identifying the online purchases by the subset of users, compare the online purchases to products carried at the physical location associated with the merchant to determine one or more additional products from the online purchases that are not carried at the physical location associated with the merchant;

generate merchant insights comprising a recommendation to add the one or more additional products from the online purchases that are not carried at the physical location associated with the merchant to the target area within the physical location associated with the merchant; and provide the merchant insights comprising the one or more additional products to a client device associated with the merchant.

17. The system of claim 16, wherein the instructions cause the system to receive the one or more indications based on the subset of users having visited the physical location associated with the merchant within a predefined time period.

18. The system of claim 16, further comprising instructions that, when executed by the processor, cause the system to:

determine, based on one or more presence detectors within the physical location associated with the merchant being triggered within the target area, that one or more mobile devices associated with the subset of users have visited the target area within the physical location associated with the merchant at least a threshold number of times; and receive the one or more indications by receiving an indication that the subset of users have visited the target area within the physical location associated with the merchant at least the threshold number of times.

19. The system of claim 16, wherein the instructions cause the system to detect the target area within the physical location associated with the merchant where the subset of users have visited based on one or more presence detectors within the target area being triggered.

20. The system of claim 19, wherein the instructions cause the system to provide the merchant insights to the merchant to add the one or more additional products from the online purchases to the target area within the physical location associated with the merchant based on detecting the subset of users visiting the target area for at least a threshold amount of time.

* * * * *